United States Patent
Machida et al.

(10) Patent No.: US 6,851,409 B2
(45) Date of Patent: Feb. 8, 2005

(54) APPARATUS AND METHOD FOR CONTROLLING INTAKE AIR AMOUNT OF INTERNAL COMBUSTION ENGINE

(75) Inventors: Kenichi Machida, Atsugi (JP); Hirokazu Shimizu, Atsugi (JP); Isamu Iizuka, Atsugi (JP)

(73) Assignee: Hitachi Unisia Automotive, Ltd., Atsugi (JP)

(*) Notice: Subject to any disclaimer, the term of this patent is extended or adjusted under 35 U.S.C. 154(b) by 0 days.

(21) Appl. No.: 10/268,688

(22) Filed: Oct. 11, 2002

(65) Prior Publication Data

US 2003/0075151 A1 Apr. 24, 2003

(30) Foreign Application Priority Data

Oct. 12, 2001 (JP) ........................ 2001-315386
Oct. 18, 2001 (JP) ........................ 2001-320953
Nov. 7, 2001 (JP) ........................ 2001-342176
Dec. 20, 2001 (JP) ........................ 2001-388160

(51) Int. Cl.$^7$ ................................... F02D 9/02
(52) U.S. Cl. ................... 123/399; 123/90.15
(58) Field of Search ................. 123/90.15, 90.16, 123/90.17, 90.18, 399, 299

(56) References Cited

U.S. PATENT DOCUMENTS 5,690,071 A * 11/1997 Jankovic ................. 123/436
6,415,753 B1 * 7/2002 Nagaosa et al. ........ 123/90.18
6,488,008 B1 * 12/2002 Jankovic et al. .......... 123/399
6,502,545 B1 * 1/2003 Ganser et al. ............ 123/399
6,553,964 B2 * 4/2003 Arai et al. ................. 123/399
6,675,768 B2 * 1/2004 Kanai ....................... 123/336
2003/0230279 A1 * 12/2003 Burkhard et al. ......... 123/399

FOREIGN PATENT DOCUMENTS

JP      6-272580     9/1994
JP      2001-12262   1/2001

* cited by examiner

*Primary Examiner*—Erick Solis
(74) *Attorney, Agent, or Firm*—Foley & Lardner LLP

(57) ABSTRACT

In an internal combustion engine provided with a variable valve mechanism that varies at least a valve operating characteristic (valve lift amount, valve operating angle and the like) of an intake valve, a target volume flow ratio equivalent to a target torque of the engine is obtained to be converted into a valve opening area, and a target valve operating characteristic of the variable valve mechanism is set based on the converted valve opening area, to control the variable valve mechanism so that an actual valve operating characteristic reaches a target valve operating angle, thereby executing with high accuracy an intake air amount control mainly by the variable valve mechanism.

52 Claims, 25 Drawing Sheets

(b) SETTING OF VTC TARGET PHASE ANGLE TGVTC (c1: SETTING OF VEL TARGET OPERATING ANGLE TGVEL)

(c1:SETTING OF VEL TARGET OPERATING ANGLE TGVEL)

(c-2) CALCULATION OF VALVE TIMING BASED CORRECTION VALUE KHOSIVC (c-3) SETTING OF VALVE UPSTREAM PRESSURE BASED CORRECTION VALUE KMANIP (d-1) SETTING OF TARGET THROTTLE OPENING TDTVO (d-2) CALCULATION OF INTAKE VALVE OPENING BASED CORRECTION VALUE KAVEL

LIFT CURVE AT EQUIVALENT IVO

APPARATUS AND METHOD FOR CONTROLLING INTAKE AIR AMOUNT OF INTERNAL COMBUSTION ENGINE

FIELD OF THE INVENTION

The present invention relates to a technique for controlling an intake air amount by a variable valve mechanism in an engine, which varies at least an operation characteristic of an intake valve.

RELATED ART OF THE INVENTION

Heretofore, there has been known a variable valve mechanism constituted to successively vary a valve lift amount and a valve operating angle (refer to Japanese Unexamined Patent Publication 2001-012262).

In an engine provided with such a variable valve mechanism, a valve lift amount and a valve operating angle are controlled by the variable valve mechanism, to control an intake air amount independently of a throttle valve. However, in this case, since a torque control by the throttle valve cannot be performed, there occurs a problem of how the torque linearity is ensured.

Further, in the case where the intake air amount control is performed by the above variable valve mechanism, it is impossible to generate, in an intake air passage, a negative pressure for the canister purging or the blowby gas processing. Moreover, from such a mechanism, since there is a limitation in controllable valve operating characteristic (valve lift amount and valve operating angle), it becomes necessary to perform a control by the throttle valve in addition to the control by the variable valve mechanism, depending on conditions.

In such a case, there occurs a problem of how the cooperative control of the variable valve mechanism and the throttle valve is performed (how the control accuracy is ensured).

On the other hand, there has been known an engine having a constitution wherein a target torque is set based on an accelerator angle and an engine rotation speed, and an operating characteristic of intake valve and/or an opening of throttle valve are changed so that an intake air amount corresponding to the target torque can be obtained (refer to Japanese Unexamined Patent Publication No. 6-272580). In this engine, operation timing of intake valve is obtained based on the target torque and the engine rotation speed, so as to enable to change the generated torque linearly corresponding to the throttle valve opening.

However, such a conventional mechanism relates to a variable valve timing mechanism (apparatus) that varies "operation timing" of intake valve, and is to control the intake air amount mainly by the throttle valve. Therefore, it cannot be applied to an engine in which the intake air amount is controlled mainly by the variable valve mechanism. The above problem still remains unsolved.

SUMMARY OF THE INVENTION

The present invention has been achieved in view of the above problems and has an object to ensure torque linearity with high accuracy when performing an intake air amount control by a variable valve mechanism.

A further object of the present invention is to appropriately perform a cooperative control of the variable valve mechanism and a throttle valve so as to enable to cope with the generation of requested negative pressure and the like, while executing the intake air amount control (torque control) mainly by the variable valve mechanism.

In order to achieve the above objects, according to the intake air amount control of the present invention, in an engine provided with a variable valve mechanism that varies at least a valve operating characteristic of an intake valve, a target intake air amount equivalent to a target torque is set in accordance with operating conditions of the engine, a target valve operating characteristic is set based on the set target intake air amount, and the variable valve mechanism is controlled so that an actual valve operating characteristic reaches the target valve operating characteristic.

With such a constitution, the intake air amount control mainly by the variable valve mechanism can be executed with high accuracy, while ensuring the torque linearity.

Further, in an engine provided with a throttle valve driven to open and close by an actuator in addition to the above variable valve mechanism, the variable valve mechanism is controlled so that the actual valve operating characteristic becomes the target valve operating characteristic, and also a target throttle opening of the throttle valve is set based on the target intake air amount and the valve operating characteristic to control the actuator so that an actual throttle opening reaches the target throttle opening.

With such a constitution, the intake air amount control mainly by the variable valve mechanism and also with the variable valve mechanism cooperated with the throttle valve can be executed. Thus, it becomes possible to execute the intake air amount control with higher accuracy and also to cope with the negative pressure request and the like.

The other objects and features of this invention will become understood from the following description with accompanying drawings.

BRIEF EXPLANATION OF THE DRAWINGS

FIG. 13 to FIG. 20 are block diagrams showing the details of intake air amount control in the embodiment, in which:

FIG. 13 is a block diagram showing the setting of a target phase angle of the variable valve timing mechanism;

FIG. 15 is a block diagram showing the correction by a flow loss value in accordance with a valve operating characteristic (a lift amount);

FIG. 16 is a block diagram showing the calculation of a valve timing based correction value KHOSIVC for the correction in accordance with closing timing of an intake valve;

FIG. 17 is a block diagram showing the setting of a valve upstream pressure based correction value KMANIP for the correction in accordance with an intake pressure on the upstream side of intake valve;

FIG. 18 is a block diagram showing the setting of a target throttle opening of a throttle valve;

FIG. 19 is a block diagram showing the calculation of an intake valve opening based correction value KAVEL for the correction in accordance with an actual operating characteristic of intake valve; and FIG. 20 is a block diagram showing the calculation of a ratio WQH0VEL of volume flow passed through the intake valve at the time when the throttle valve is fully opened and a ratio RQH0VEL of volume flow actually passed through the intake valve.

FIG. 21 to FIG. 24 are block diagrams showing the details of intake air amount control in another embodiment, in which:

FIG. 21 is a block diagram showing the setting of a target operating angle of the variable valve mechanism and a target phase angle of the variable valve timing mechanism;

FIG. 22 is a block diagram showing the calculation of an effective opening area of the intake valve;

FIG. 23 is a block diagram showing a volume flow ratio of the intake valve; and

FIG. 24 is a block diagram showing the setting of a target throttle opening of the throttle valve.

DETAILED DESCRIPTION OF THE EMBODIMENTS

Embodiments of the present invention will be described based on the drawings.

Figure 1:
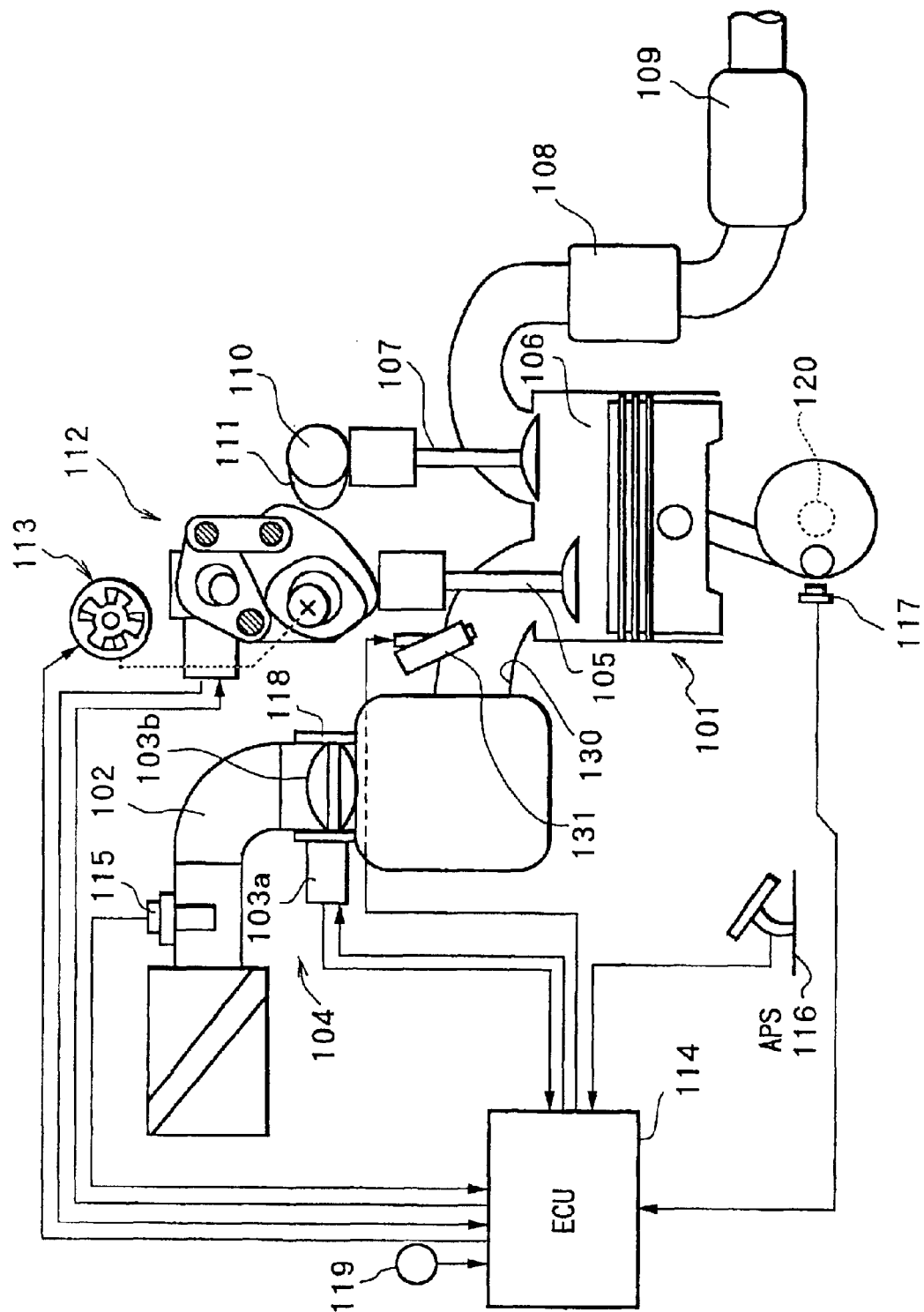
FIG. 1 is a view showing a system structure of an internal combustion engine in an embodiment of the present invention.

FIG. 1 is a structural diagram of an internal combustion engine for vehicle. In FIG. 1, in an intake passage 102 of an internal combustion engine 101, an electronically controlled throttle 104 is disposed for driving a throttle valve 103b to open and close by a throttle motor 103a. Air is sucked into a combustion chamber 106 via electronically controlled throttle 104 and an intake valve 105.

A combusted exhaust gas is discharged from combustion chamber 106 via an exhaust valve 107, purified by an exhaust purification catalyst 108, and then emitted into the atmosphere via a muffler 109.

Exhaust valve 107 is driven by a cam 111 axially supported by an exhaust side camshaft 110, while keeping a valve lift amount and a valve operating angle thereof constant. On the contrary, the valve lift amount and valve operating angle of intake valve 105 are successively varied by a variable valve mechanism (VEL) 112, and valve timing thereof is successively varied by a variable valve timing mechanism (VTC) 113. Further, there may be provided a mechanism for varying valve operating characteristics of intake valve 105 and exhaust valve 107.

A control unit (C/U) 114 incorporating therein a microcomputer, controls the drive of electronically controlled throttle 104, variable valve mechanism (VEL) 112 and variable valve timing mechanism (VTC) 113 in accordance with an accelerator opening APO to be detected by an accelerator opening sensor APS 116, so that an intake air amount corresponding to the accelerator opening can be obtained based on an opening of throttle valve 103b and an opening characteristic of intake valve 105.

Specifically, the opening of throttle valve 103b is controlled so as to generate a constant negative pressure (target Boost) for the canister purging and the blowby gas processing, while controlling the intake air amount by controlling the valve lift amount (and valve operating angle) of variable valve mechanism (VEL) 112.

Note, under an operating condition where there is no negative pressure request, a so-called throttle-less control in which throttle valve 103b is kept full-opened and the intake air amount is controlled only by variable valve mechanism (VEL) 112, is performed. In the case where the intake air amount cannot be controlled only by variable valve mechanism (VEL) 112, throttle valve 103b is also controlled.

Control unit (C/U) 114 receives various detection signals from an air flow meter 115 detecting an intake air amount (mass flow) Qa, a crank angle sensor 117 taking out a rotation signal from a crankshaft, a throttle sensor 118 detecting an opening TVO of throttle valve 103b, a water temperature sensor 119 detecting a cooling water temperature Tw of engine 101 and the like, in addition to a detection signal from accelerator opening sensor APS 116.

In control unit (C/U) 114, an engine rotation speed Ne is calculated based on the rotation signal output from crank angle sensor 117. Further, an electromagnetic fuel injection valve 131 is disposed on an intake port 130 on the upstream side of intake valve 105 of each cylinder. Fuel injection valve 131 injects fuel adjusted at a predetermined pressure toward intake valve 105 when driven to open by an injection pulse signal from control unit (C/U) 114.

Here, a structure of variable valve mechanism (VEL) 112 will be described.

Figure 2:
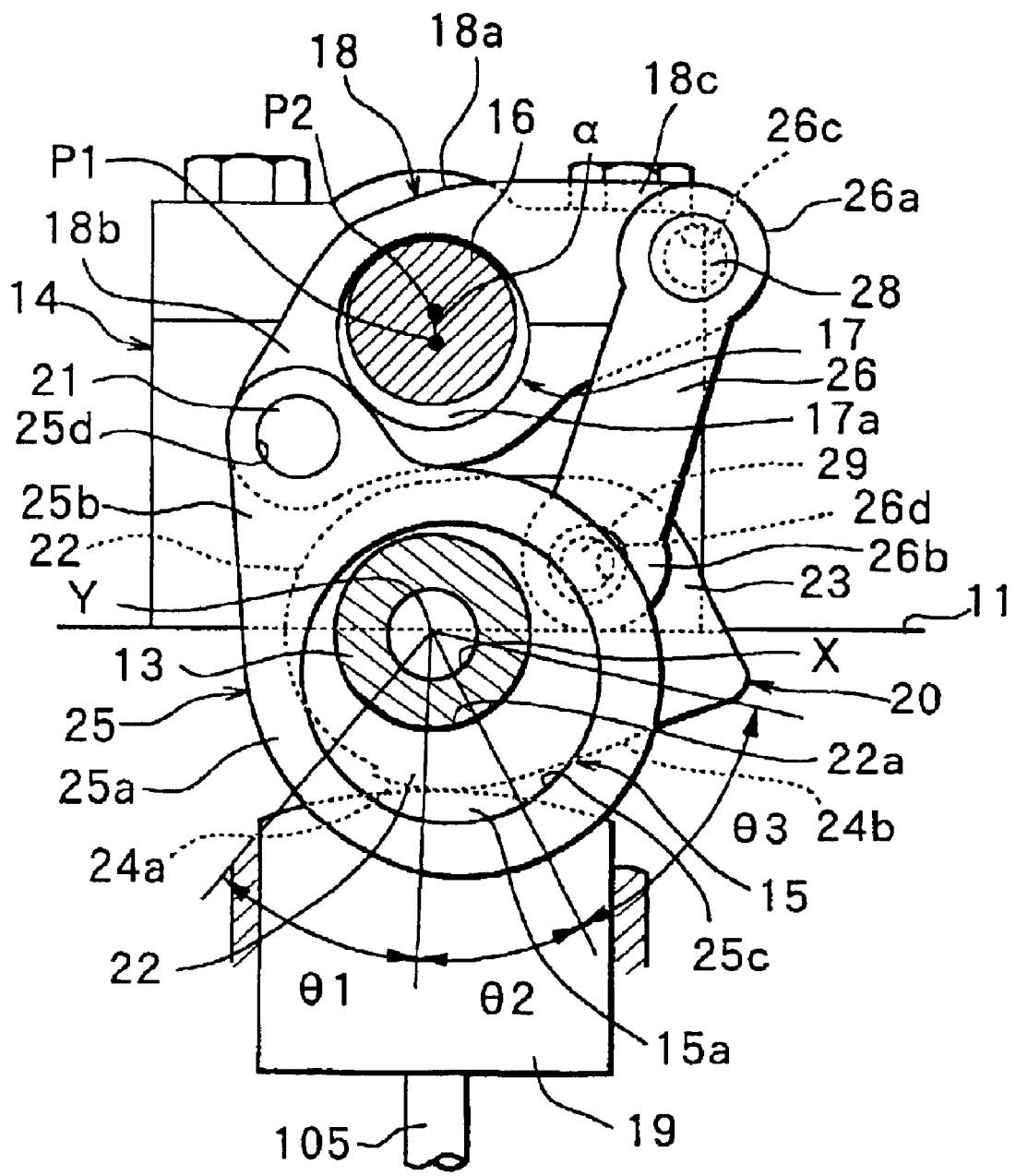
FIG. 2 is a cross section view showing a variable valve mechanism in the embodiment (A—A cross section view of FIG. 3)
Figure 3:
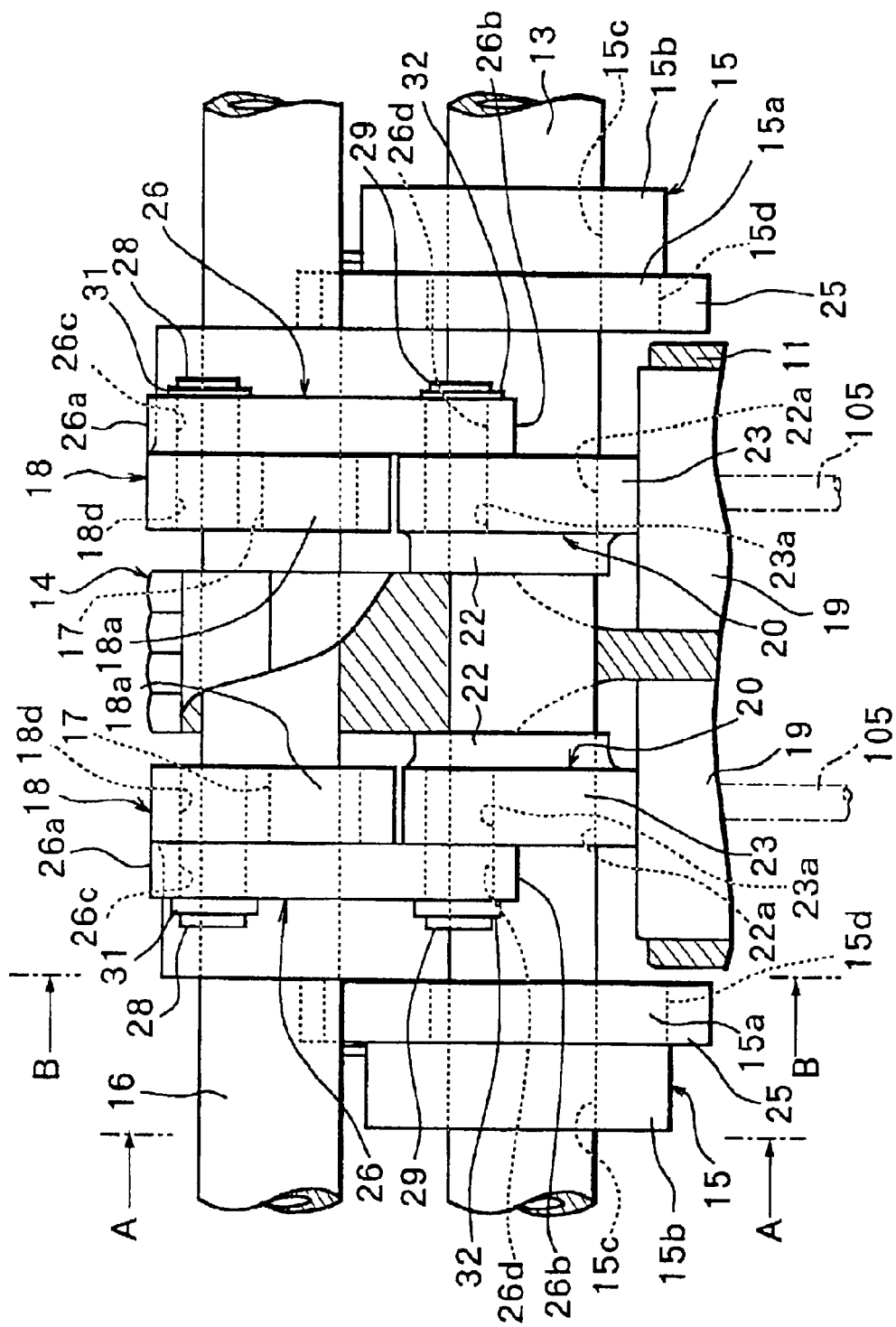
FIG. 3 is a side elevation view of the variable valve mechanism.
Figure 4:
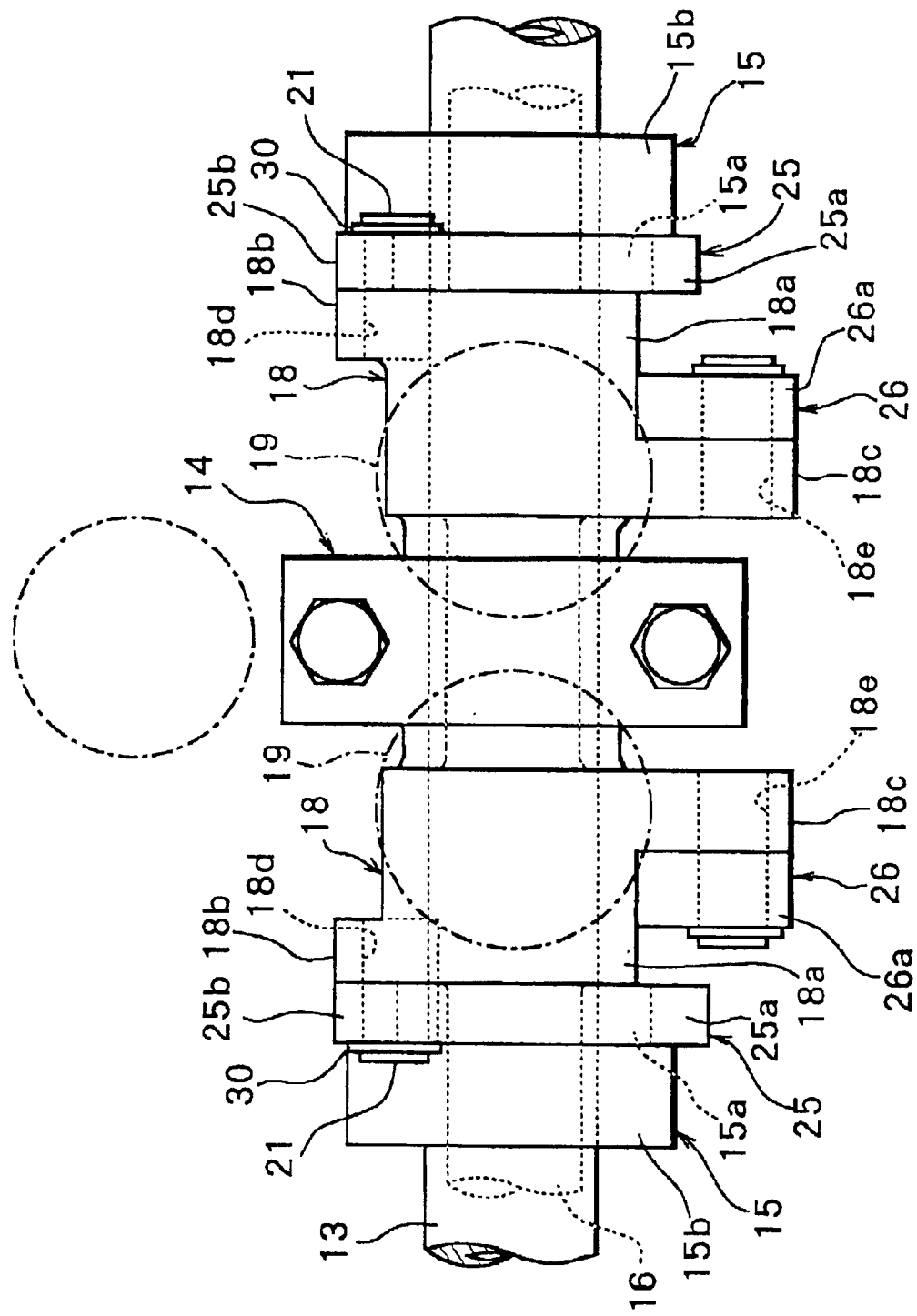
FIG. 4 is a top plan view of the variable valve mechanism.

FIG. 2 to FIG. 4 show in detail the structure of variable valve mechanism (VEL) 112 (however, this merely shows one example, and the present invention is not limited to such a structure).

Variable valve mechanism (VEL) 112 shown in FIG. 2 to FIG. 4 includes a pair of intake valves 105, 105, a hollow camshaft (drive shaft) 13 rotatably supported by a cam bearing 14 of a cylinder head 11, two eccentric cams (drive cams) 15, 15 being rotation cams axially supported by a camshaft 13, a control shaft 16 rotatably supported by the same cam bearing 14 at an upper position of camshaft 13, a pair of rocker arms 18, 18 swingingly supported by control shaft 16 through a control cam 17, and a pair of independent swing cams 20, 20 disposed to upper end portions of intake valves 105, 105 through valve lifters 19, 19, respectively.

Eccentric cams 15, 15 are connected with rocker arms 18, 18 by link arms 25, 25, respectively. Rocker arms 18, 18 are connected with swing cams 20, 20 by link members 26, 26. Rocker arms 18, 18, link arms 25, 25, and link members 26, 26 constitute a transmission mechanism.

Figure 5:
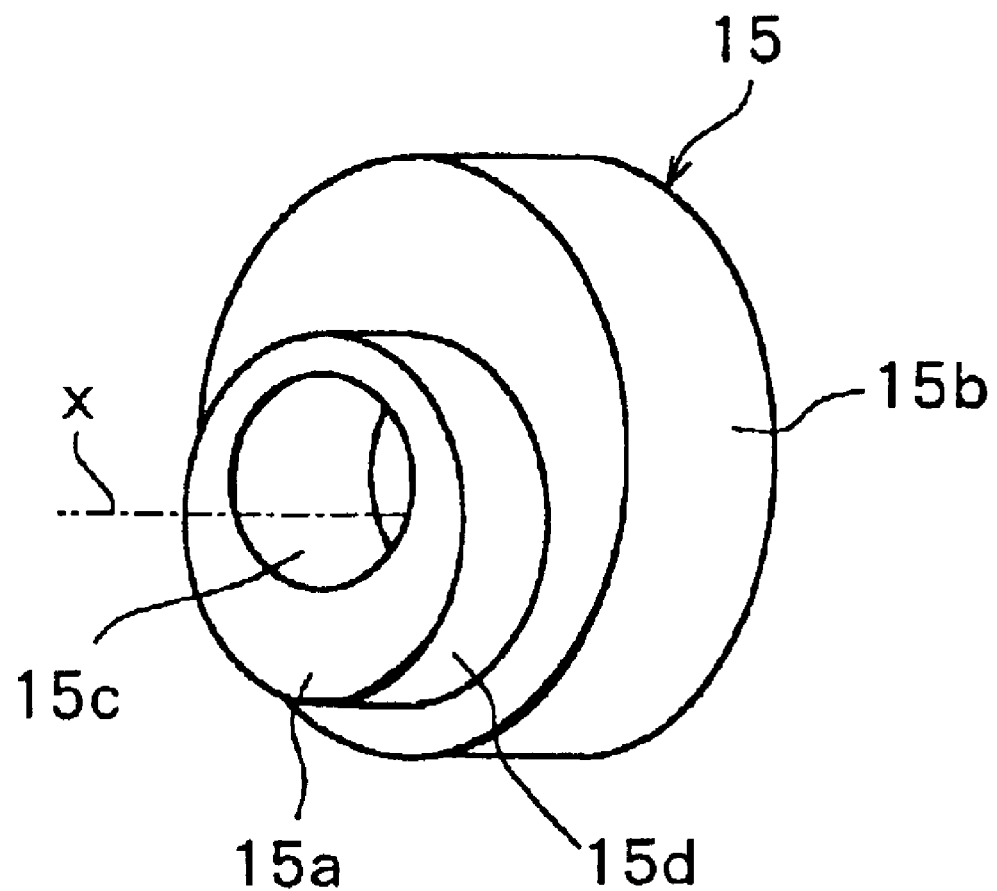
FIG. 5 is a perspective view showing an eccentric cam for use in the variable valve mechanism.

Each eccentric cam 15, as shown in FIG. 5, is formed in a substantially ring shape and includes a cam body 15a of small diameter, a flange portion 15b integrally formed on an outer surface of cam body 15a. A camshaft insertion hole 15c is formed through the interior of eccentric cam in an axial direction, and also a center axis X of cam body 15a is biased from a center axis Y of camshaft 13 by a predetermined amount.

Eccentric cams 15, 15 are pressed and fixed to both outer sides of camshaft 13 via camshaft insertion holes 15c at positions not interfering with valve lifters 19, 19. Outer peripheral surfaces 15d, 15d of cam bodies 15a, 15a are formed in the same profile.

Each rocker arm 18, as shown in FIG. 4, is bent and formed in a substantially crank shape, and a central base portion 18a thereof is rotatably supported by control cam 17.

A pin hole 18d is formed through one end portion 18b which is formed to protrude from an outer end portion of base portion 18a. A pin 21 to be connected with a tip portion of link arm 25 is pressed into pin hole 18d. A pin hole 18e is formed through the other end portion 18c which is formed to protrude from an inner end portion of base portion 18a. A pin 28 to be connected with one end portion 26a (to be described later) of each link member 26 is pressed into pin hole 18e.

Control cam 17 is formed in a cylindrical shape and fixed to a periphery of control shaft 16. As shown in FIG. 2, a center axis P1 position of control cam 17 is biased from a center axis P2 position of control shaft 16 by α.

Figure 6:
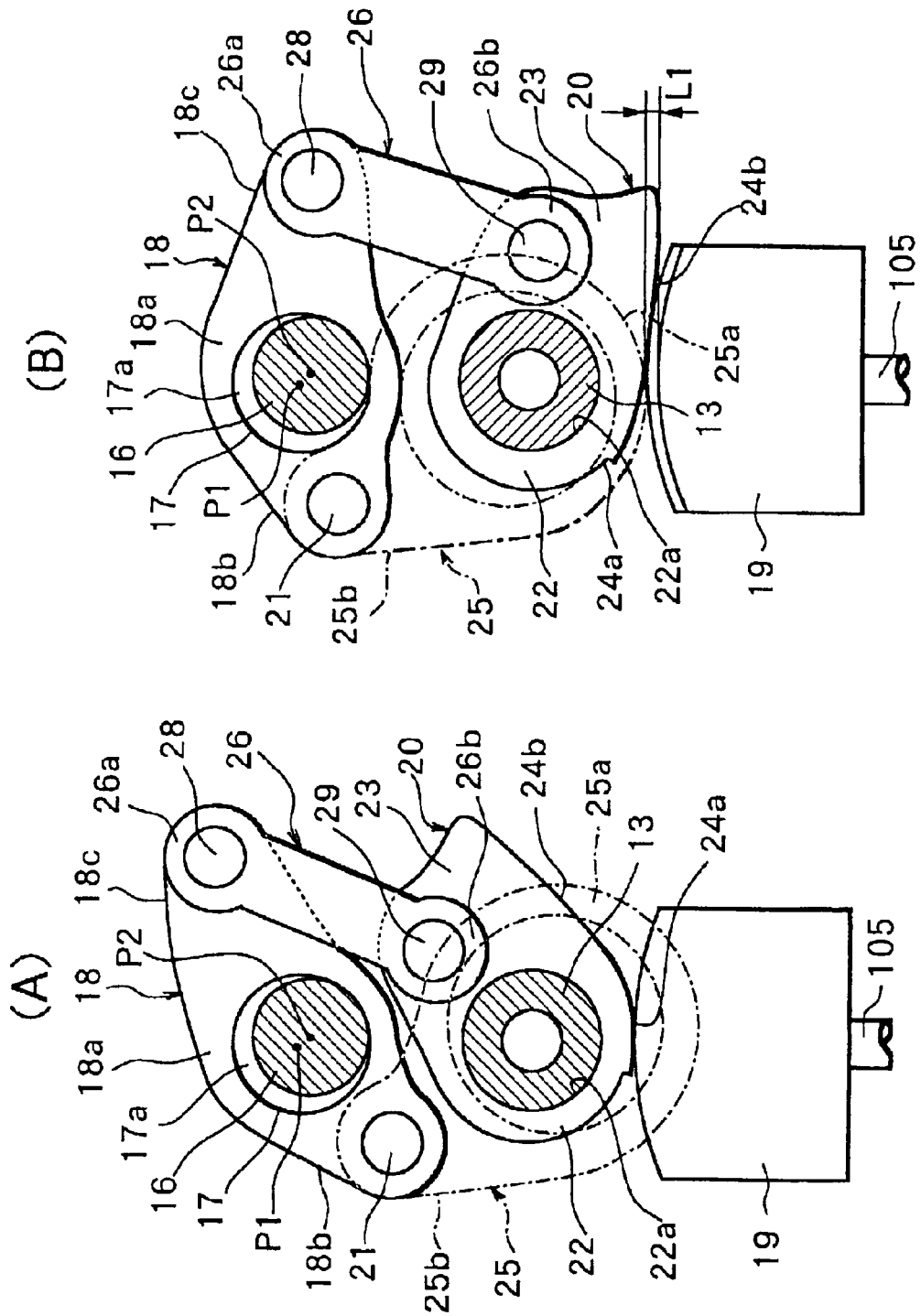
FIG. 6A and FIG. 6B are cross section views showing an operation of the variable valve mechanism at a low lift condition (B—B cross section view of FIG. 3).
Figure 7:
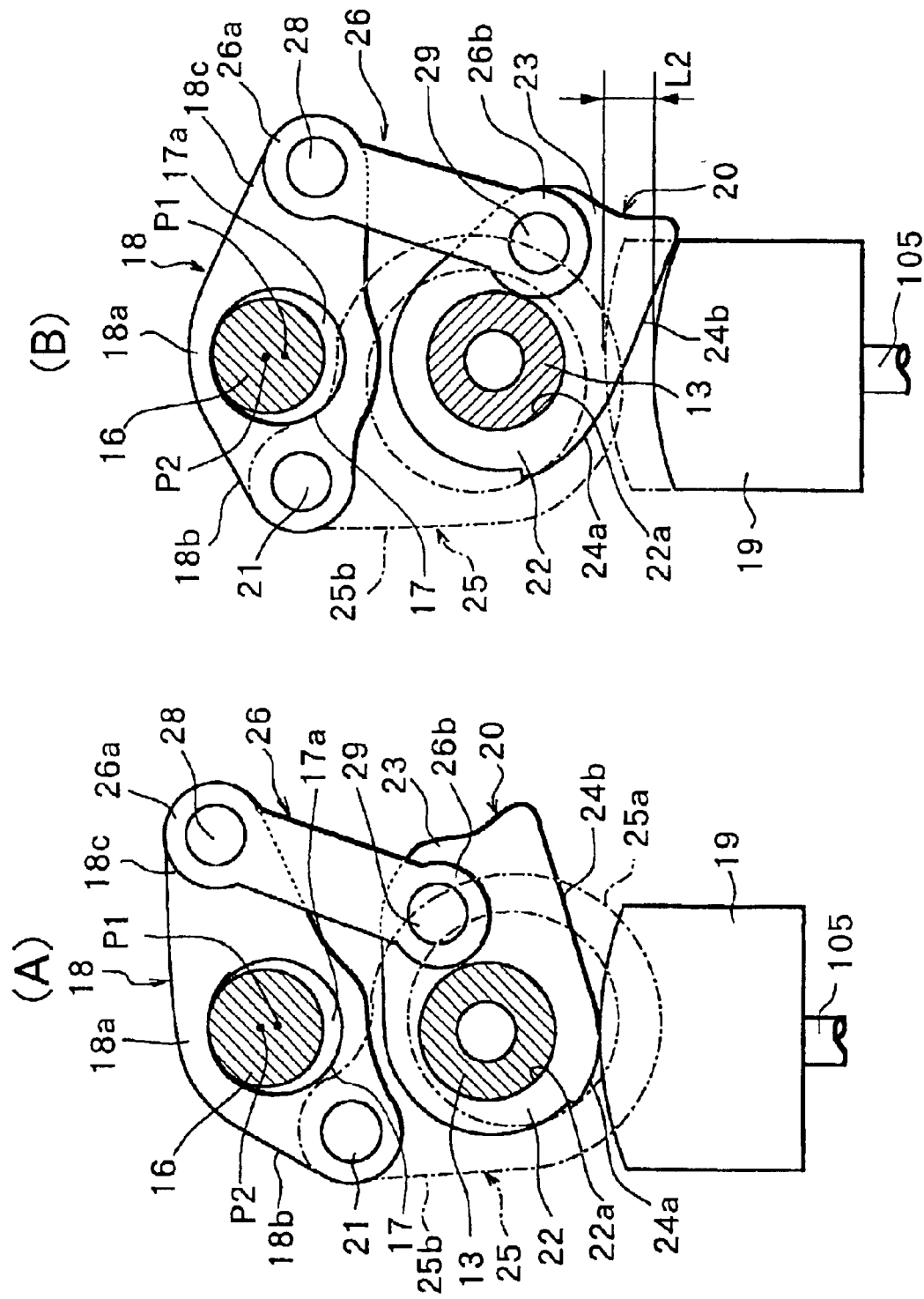
FIG. 7A and FIG. 7B are cross section views showing an operation of the variable valve mechanism at a high lift condition (B—B cross section view of FIG. 3).

Swing cam 20 is formed in a substantially lateral U-shape as shown in FIG. 2, FIG. 6 and FIG. 7, and a supporting hole 22a is formed through a substantially ring-shaped base end portion 22. Camshaft 13 is inserted into base end portion 22 to be rotatably supported. Also, a pin hole 23a is formed through an end portion 23 positioned at the other end portion 18c of rocker arm 18.

A base circular surface 24a of base end portion 22 side and a cam surface 24b extending in an arc shape from base circular surface 24a to an edge of end portion 23, are formed on a bottom surface of swing cam 20. Base circular surface 24a and cam surface 24b are in contact with a predetermined position of an upper surface of each valve lifter 19 corresponding to a swing position of swing cam 20.

Figure 8:
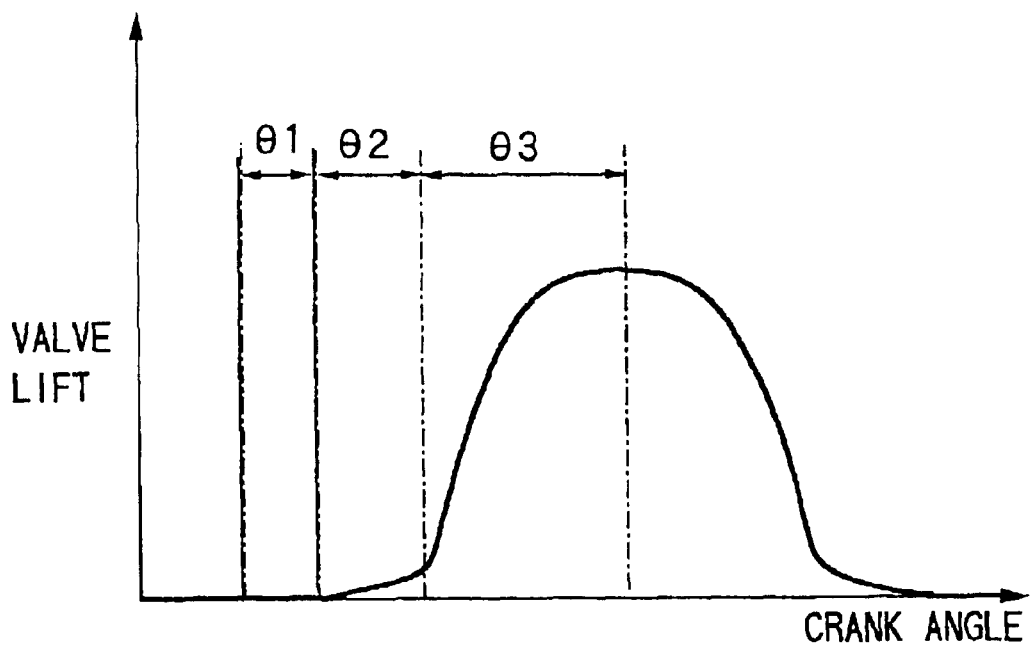
FIG. 8 is a valve lift characteristic diagram corresponding to a base end face and a cam surface of a swing cam in the variable valve mechanism.

Namely, according to a valve lift characteristic shown in FIG. 8, as shown in FIG. 2, a predetermined angle range θ1 of base circular surface 24a is a base circle interval and a range of from base circle interval θ1 of cam surface 24b to a predetermined angle range θ2 is a so-called ramp interval, and a range of from ramp interval θ2 of cam surface 24b to a predetermined angle range θ3 is a lift interval.

Link arm 25 includes a ring-shaped base portion 25a and a protrusion end 25b protrudingly formed on a predetermined position of an outer surface of base portion 25a. A fitting hole 25c rotatably to be fitted with the outer surface of cam body 15a of eccentric cam 15 is formed on a central position of base portion 25a. Also, a pin hole 25b into which pin 21 is rotatably inserted is formed through protrusion end 25b.

Link member 26 is formed in a linear shape of predetermined length and pin insertion holes 26c, 26d are formed through both circular end portions 26a, 26b. End portions of pins 28, 29 pressed into pin hole 18d of the other end portion 18c of rocker arm 18 and pin hole 23a of end portion 23 of swing cam 20, respectively, are rotatably inserted into pin insertion holes 26c, 26d. Snap rings 30, 31, 32 restricting axial transfer of link arm 25 and link member 26 are disposed on respective end portions of pins 21, 28, 29.

In such a constitution, depending on a positional relation between the center axis P2 of control shaft 16 and the center axis P1 of control cam 17, as shown in FIG. 6 and FIG. 7, it is possible to vary the valve lift amount, and by driving control shaft 16 to rotate, the position of the center axis P2 of control shaft 16 relative to the center axis P1 of control cam 17 is changed.

Figure 9:
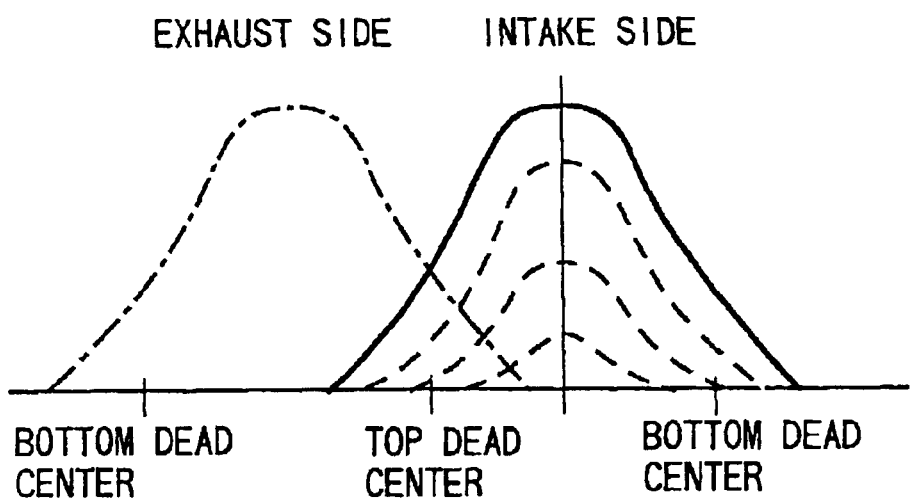
FIG. 9 is a characteristic diagram showing valve timing and valve lift of the variable valve mechanism.

Control shaft 16 is driven to rotate within a predetermined angle range by a DC servo motor (actuator) 121 disposed at one end portion thereof. By varying the operating angle of control shaft 16 by DC servo motor 121, the valve lift amount and valve operating angle of each of intake valves 105, 105 are successively varied (refer to FIG. 9).

Figure 10:
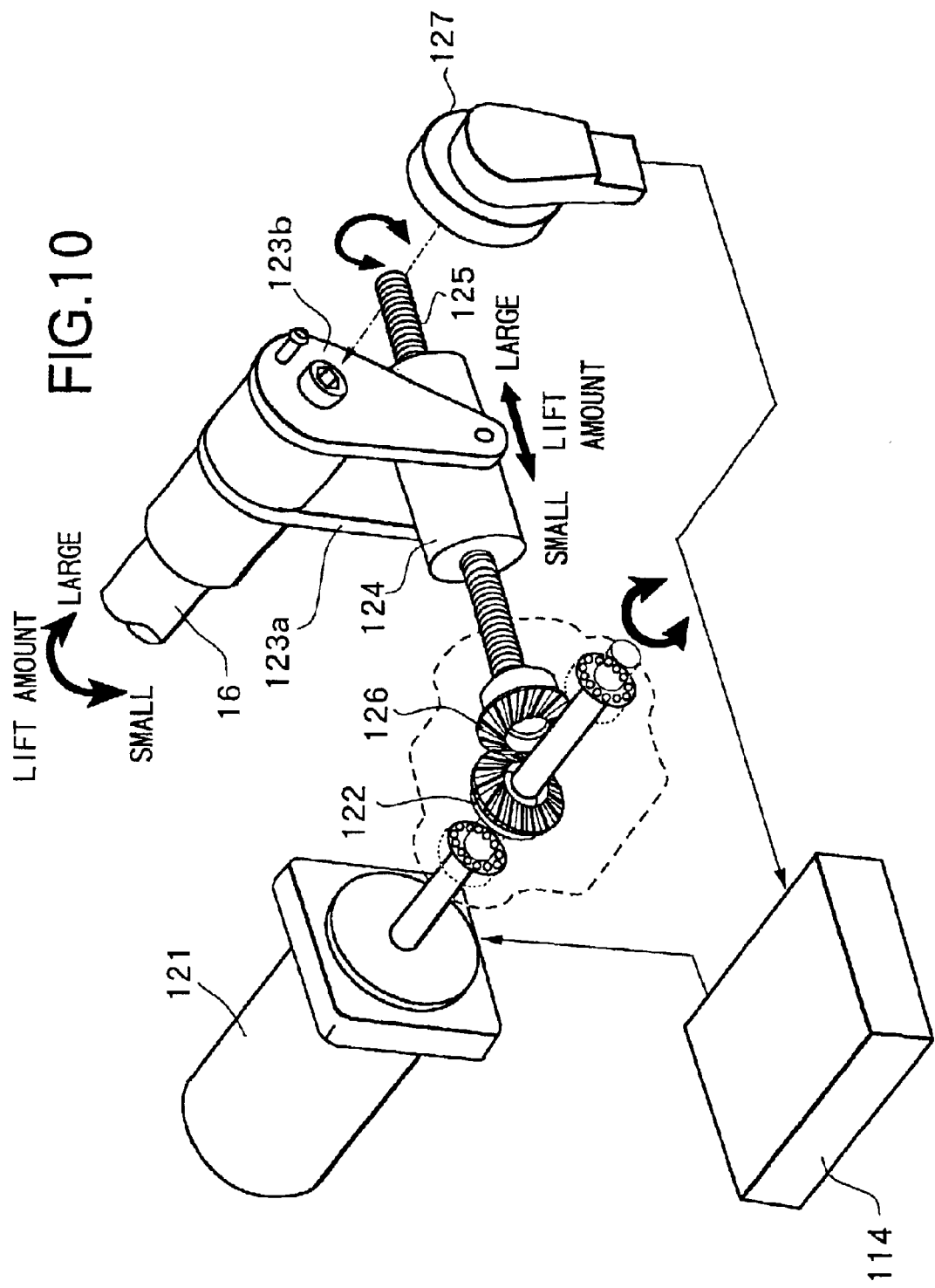
FIG. 10 is a perspective view showing a rotational driving mechanism of a control shaft in the variable valve mechanism.

In FIG. 10, DC servo motor 121 is arranged so that the rotation shaft thereof is parallel with control shaft 16, and a bevel gear 122 is axially supported by the tip portion of the rotation shaft.

On the other hand, a pair of stays 123a, 123b are fixed to the tip portion of control shaft 16. A nut 124 is swingingly supported around an axis parallel to control shaft 16 connecting the tip portions of the pair of stays 123a, 123b.

A bevel gear 126 meshed with bevel gear 122 is axially supported at the tip portion of a threaded rod 125 engaged with nut 124. Threaded rod 126 is rotated by the rotation of DC servo motor 121, and the position of nut 124 engaged with threaded rod 125 is displaced in the axial direction of threaded rod 125, so that control shaft 16 is rotated.

Here, the valve lift amount is decreased as the position of nut 124 approaches bevel gear 126, while the valve lift amount is increased as the position of nut 124 gets away from bevel gear 126.

Further, a potentiometer type operating angle sensor 127 detecting the operating angle of control shaft 16 is disposed on the tip portion of control shaft 16, as shown in FIG. 10. Control unit 114 feedback controls DC servo motor (actuator) 121 so that an actual operating angle detected by operating angle sensor 127 coincides with a target operating angle.

Figure 11:
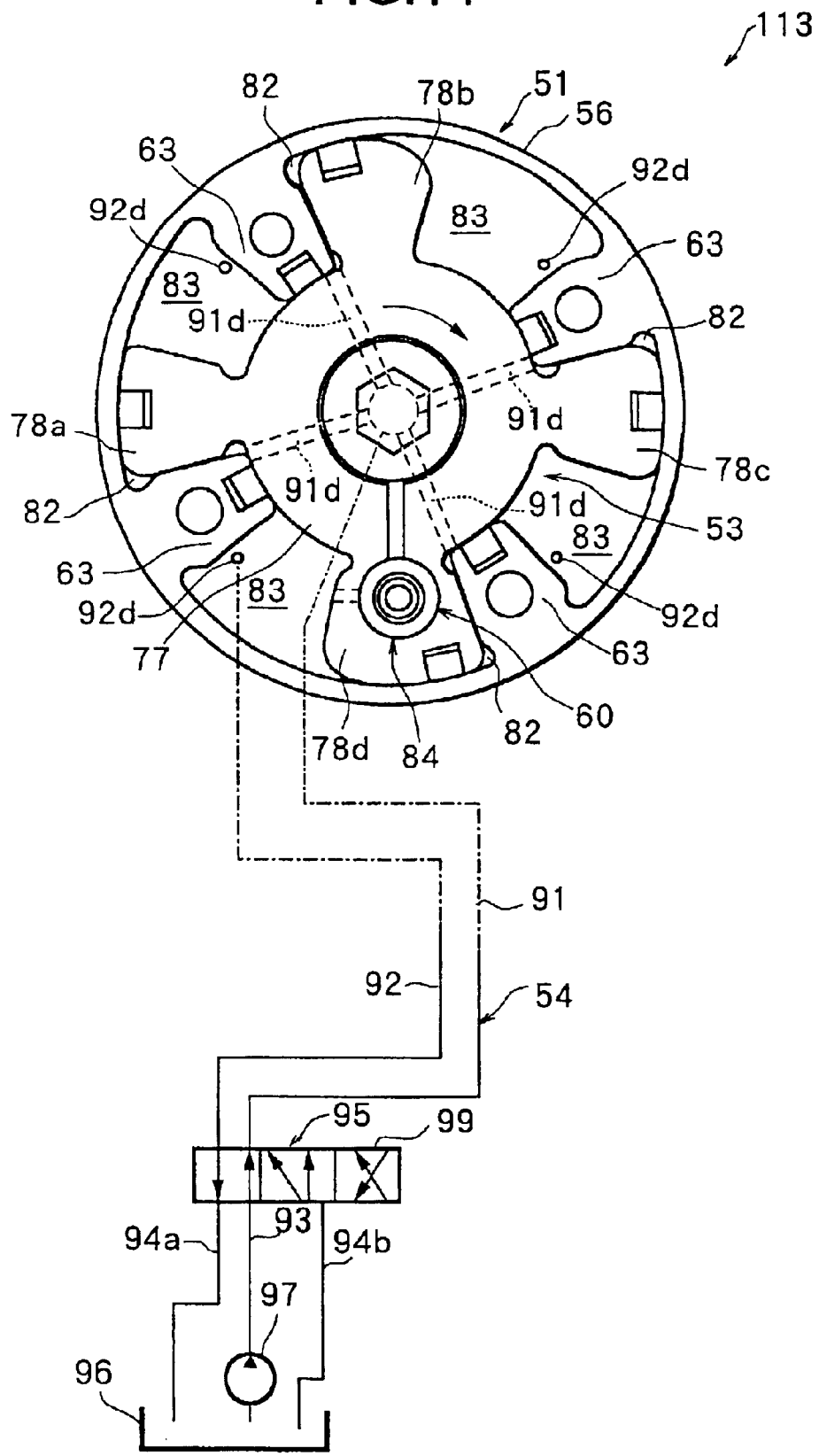
FIG. 11 is a longitudinal section view of a variable valve timing mechanism in the embodiment.

Next, the structure of variable valve timing mechanism (VTC) 113 will be described. FIG. 11 shows in detail the structure of variable valve timing mechanism (VTC) 113. (However, this structure is merely one example, and the present invention is not limited to such a structure). Variable valve timing mechanism (VTC) 113 shown in FIG. 11 is a so-called vane type variable valve timing mechanism, and comprises: a cam sprocket 51 (timing sprocket) which is rotatably driven by a crankshaft 120 via a timing chain; a rotation member 53 secured to an end portion of intake side camshaft 13 and rotatably housed inside cam sprocket 51; a hydraulic circuit 54 that relatively rotates rotation member 53 with respect to cam sprocket 51; and a lock mechanism 60 that selectively locks a relative rotation position between cam sprocket 51 and rotation member 53 at predetermined positions.

Cam sprocket 51 comprises: a rotation portion (not shown in the figure) having on an outer periphery thereof, teeth for engaging with timing chain (or timing belt); a housing 56 located forward of the rotation portion, for rotatably housing rotation member 53; and a front cover and a rear cover (not shown in the figure) for closing the front and rear openings of housing 56.

Housing 56 presents a cylindrical shape formed with both front and rear ends open and with four partition portions 63 protrudingly provided at positions on the inner peripheral face at 90° in the circumferential direction, four partition portions 63 presenting a trapezoidal shape in transverse section and being respectively provided along the axial direction of housing 56.

Rotation member 53 is secured to the front end portion of intake side camshaft 13 and comprises an annular base portion 77 having four vanes 78a, 78b, 78c, and 78d provided on an outer peripheral face of base portion 77 at 90° in the circumferential direction.

First through fourth vanes 78a to 78d present respective cross-sections of approximate trapezoidal shapes. The vanes are disposed in recess portions between each partition portion 63 so as to form spaces in the recess portions to the front and rear in the rotation direction. Advance angle side hydraulic chambers 82 and retarded angle side hydraulic chambers 83 are thus formed.

Lock mechanism 60 has a construction such that a lock pin 84 is inserted into an engagement hole (not shown in the figure) at a rotation position (in the reference operating condition) on the maximum retarded angle side of rotation member 53.

Hydraulic circuit 54 has a dual system oil pressure passage, namely a first oil pressure passage 91 for supplying and discharging oil pressure with respect to advance angle side hydraulic chambers 82, and a second oil pressure passage 92 for supplying and discharging oil pressure with respect to retarded angle side hydraulic chambers 83. To these two oil pressure passages 91 and 92 are connected a supply passage 93 and drain passages 94a and 94b, respectively, via an electromagnetic switching valve 95 for switching the passages.

An engine driven oil pump 97 for pumping oil in an oil pan 96 is provided in supply passage 93, and the downstream ends of drain passages 94a and 94b are communicated with oil pan 96.

First oil pressure passage 91 is formed substantially radially in a base 77 of rotation member 53, and connected to four branching paths 91d communicating with each advance angle side hydraulic chamber 82. Second oil pressure passage 92 is connected to four oil galleries 92d opening to each retarded angle side hydraulic chamber 83.

With electromagnetic switching valve 95, an internal spool valve is arranged so as to control the switching between respective oil pressure passages 91 and 92, and supply passage 93 and drain passages 94a and 94b.

Control unit (C/U) 114 controls the power supply quantity for an electromagnetic actuator 99 that drives electromagnetic-switching valve 95, based on a duty control signal superimposed with a dither signal.

For example, when a control signal of duty ratio 0% (OFF signal) is output to electromagnetic actuator 99, the hydraulic fluid pumped from oil pump 47 is supplied to retarded angle side hydraulic chambers 83 via second oil pressure passage 92, and the hydraulic fluid in advance angle side hydraulic chambers 82 is discharged into oil pan 96 from (first) drain passage 94a via first oil pressure passage 91. Consequently, an inner pressure of retarded angle side hydraulic chambers 83 becomes a high pressure while an inner pressure of advance angle side hydraulic chambers 82 becomes a low pressure, and rotation member 53 is rotated to the most retarded angle side by means of vanes 78a to 78d. The result of this is that the opening period (opening timing and closing timing) of intake valve 105 is delayed.

On the other hand, when a control signal of duty ratio 100% (ON signal) is output to electromagnetic actuator 99, the hydraulic fluid pumped from oil pump 47 is supplied to inside of advance angle side hydraulic chambers 82 via first oil pressure passage 91, and the hydraulic fluid in retarded angle side hydraulic chambers 83 is discharged to oil pan 96 via second oil pressure passage 92, from (second) drain passage 94b. Therefore, retarded angle side hydraulic chambers 83 become a low pressure, and rotation member 53 is rotated to the full to the advance angle side by means of vanes 78a to 78d. Due to this, the opening period (opening timing and closing timing) of the intake valve 105 is accelerated (advanced).

In the constitution as mentioned in the above, there will be described in detail an intake air amount control executed by control unit (C/U) 114, that is a control on electronically controlled throttle 104, variable valve mechanism (VEL) 112 and variable valve timing mechanism (VTC) 113 (a first embodiment).

Figure 12:
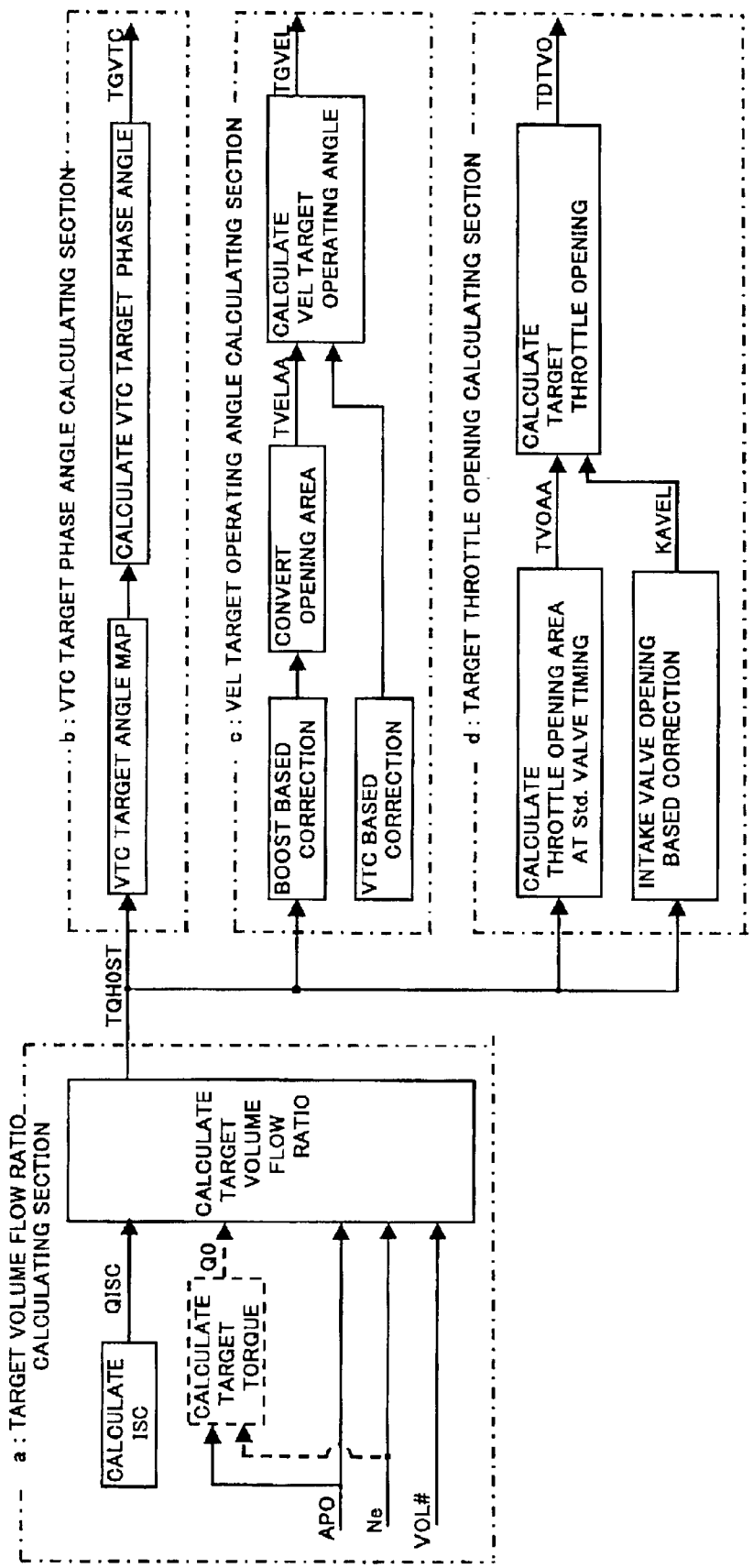
FIG. 12 is an entire block diagram showing an intake air amount control (torque control) in the embodiment.

As shown in FIG. 12, control unit (C/U) 114 includes a target volume flow ratio calculating section "a", a VTC target operating angle calculating section "b", a VEL target operating angle calculating section "c" and a target throttle opening calculating section "d".

(a) Calculation of Target Volume Flow Ratio TQH0ST

The target volume flow ratio calculating section "a" calculates a target volume flow ratio TQH0ST equivalent to a target torque as follows.

Firstly, a requested air amount (a requested engine air amount) Q0 corresponding to accelerator opening APO and engine rotation speed Ne (or, that so as to obtain a target torque set based on accelerator opening APO and engine rotation speed Ne) is calculated, and also a requested ISC air amount QISC requested in an idle rotation speed control (ISC) is calculated. Then, the requested engine air amount Q0 is added with the requested ISC air amount QISC to calculate the total requested air amount (intake air amount) Q(=Q0+QISC). The resultant total requested air amount is divided by engine rotation speed Ne and a discharge amount (total cylinder volume) VOL# to calculate target volume flow ratio TQH0ST(=Ne·VOL#).

(b) Calculation of VTC Target Phase Angle TGVT

Figure 13:
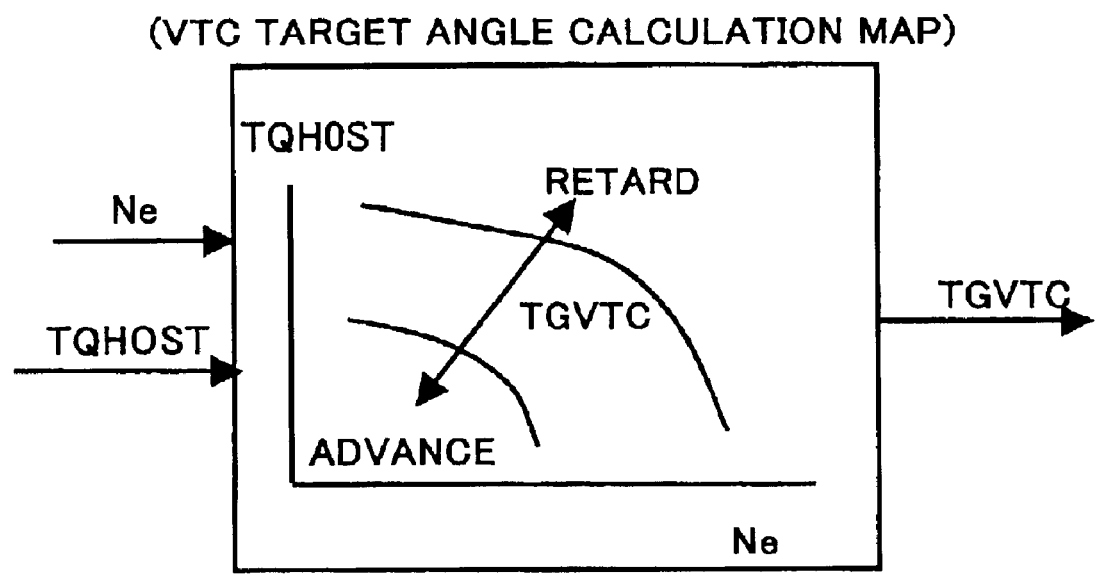

The VTC target operating angle calculating section "b", as shown in FIG. 13, calculates a target phase angle (TGVTC) of variable valve timing mechanism (VTC) 113, referring to a map as shown in the figure, based on target volume flow ratio TQH0ST and engine rotation speed Ne.

Thus, control unit (C/U) 114 controls variable valve timing mechanism (VTC) 113 so that an actual VTC phase angle reaches the target phase angle (TGVTC).

(c) Calculation of VEL Target Operating Angle TGVEL

The VEL target operating angle calculating section "c" calculates a target operating angle TGVEL (target lift amount) of variable valve mechanism (VEL) 112 so as to ensure target volume flow ratio TQH0ST, as follows.

First of all, target volume flow ratio TQH0ST is (inversely) transformed, to calculate a target valve opening area TVELAA. Then, based on target valve opening area TVELAA, target operating angle TGVEL (target lift amount) of control shaft 16 in variable valve mechanism (VEL) 112 is calculated.

Here, the target operating angle is set so as to increase the valve lift amount, as target volume flow ratio TQH0ST is larger and also engine rotation speed Ne is higher. In the case where there is a negative pressure request, or target volume flow ratio TQH0ST cannot be controlled by variable valve mechanism (VEL) 112, a throttle control of throttle valve 103b is also performed. Note, in this embodiment, larger the operating angle of control shaft 16 becomes, larger the lift amount of intake valve 105 becomes.

In the following, the calculation in the VEL target operating angle calculating section "c" will be described in detail, based on FIG. 14 to FIG. 16.

(c-1) Setting of Target Operating Angle TGVEL of Variable Valve Mechanism (VEL) 112

Figure 14A:
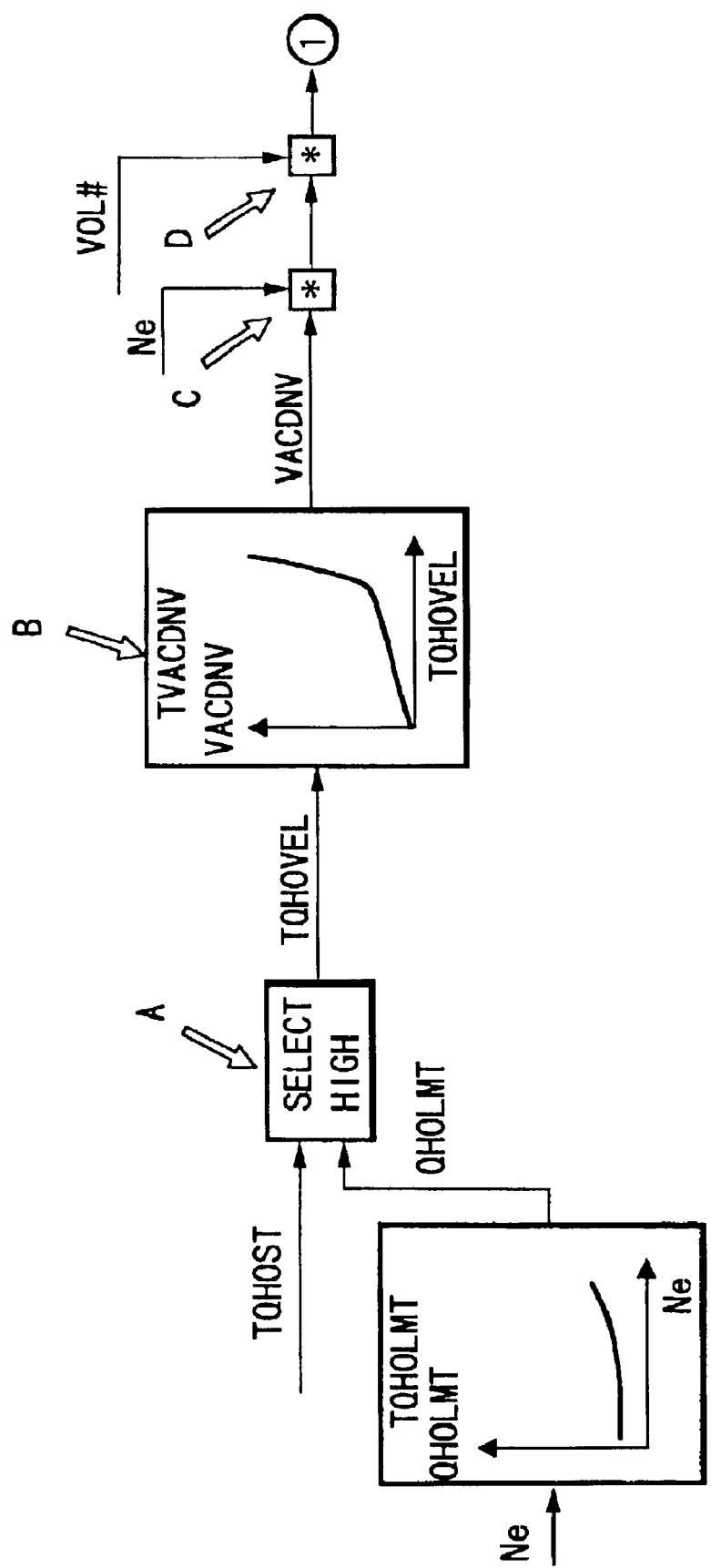
FIG. 14A and FIG. 14B are a block diagram showing the setting of a target operating angle of the variable valve mechanism.
Figure 14B:
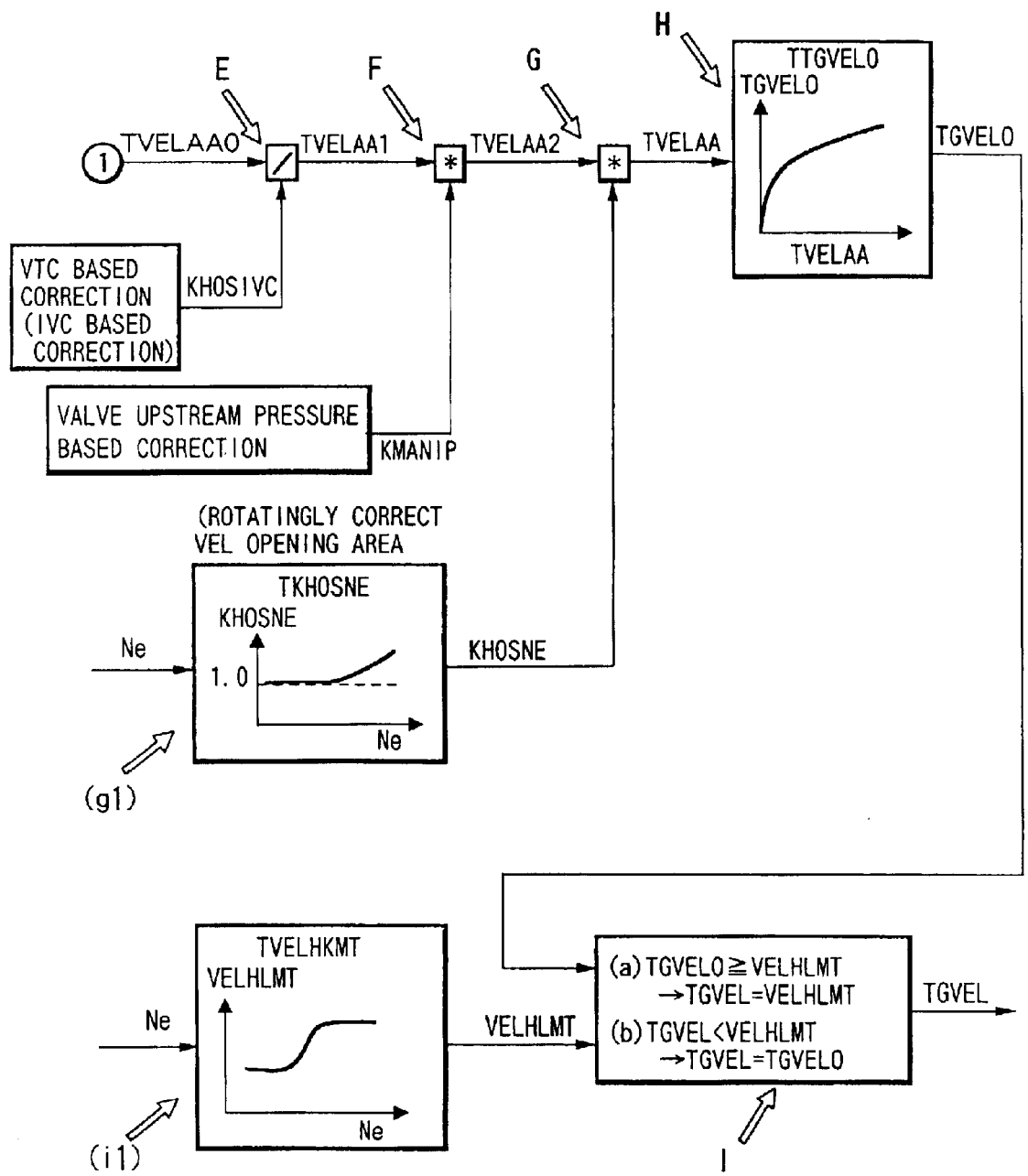

In FIG. 14, at A part, target volume flow ratio TQH0ST is compared with a minimum volume flow ratio QH0LMT, and a higher one is selected to set a volume flow ratio TQH0VEL to be realized in variable valve mechanism (VEL) 112 (to be referred to as VEL realizing volume flow ratio hereafter). Here, minimum volume flow ratio QH0LMT is the one realizable (controllable) by variable valve mechanism (VEL) 112 (that is, the volume flow ratio of when the VEL operating angle is minimum), which is calculated, in "a1" part, by retrieving a table TQH0LMT as shown in the figure, based on engine rotation speed Ne. Thus, even if target volume flow ratio TQH0ST is low (that is, irrespective of operating conditions), a target valve operating characteristic of variable valve mechanism (VEL) 112 can be set so that an intake air amount control by mainly by variable valve mechanism (VEL) 112 is executed.

When a VEL requested volume flow ratio THQ0VEL0 is less than minimum volume flow ratio QH0LMT, this minimum volume flow ratio QH0LMT is selected. However, in such a case, target volume flow ratio TQH0ST cannot be achieved only by variable valve mechanism (VEL) 112 (that is, the intake air amount control cannot be performed). Therefore, the throttle control of throttle valve 103b is also performed.

At B part, VEL realizing volume flow ratio TQH0VEL is converted into a state amount VACDNV equivalent to valve opening area (Av), VADCNV=Av·Cd/N/V (valve opening area·loss coefficient/rotation speed/exhaust amount). Such conversion is performed as follows.

At first, an air flow amount passing through intake valve 105 (that is, a cylinder intake air amount) Qc (t) (kg/sec) can be represented by equations (1), (2) based on an equation of a one-dimensional steady flow of compressed fluid.

At choke: $\frac{Pc}{P0} \leq \left(\frac{2}{\gamma+1}\right)^{\frac{\gamma}{\gamma-1}}$ $$Qc(t) = \frac{Cd \cdot Av \cdot P0}{\sqrt{R \cdot T0}} \sqrt{\gamma} \left(\frac{2}{\gamma-1}\right)^{\frac{\gamma+1}{2(\gamma-1)}} \quad (1)$$

At no choke:

$$Qc(t) = \frac{Cd \cdot Av \cdot P0}{\sqrt{R \cdot T0}} \left(\frac{Pc}{P0}\right)^{\frac{1}{\gamma}} \sqrt{\frac{2\gamma}{\gamma-1}\left(1-\left(\frac{Pc}{Pm}\right)^{\frac{\gamma-1}{\gamma}}\right)} \quad (2)$$

In the above equations, R: a gas constant (=287) (J/(Kg·K), γ: a ratio of specific heat (=1.4), Cd: an intake valve flow loss coefficient, Av: intake valve opening area (m²), P0: an intake valve upstream pressure (for example, intake manifold pressure) (Pa), Pc: an intake valve downstream pressure (that is, cylinder pressure) (Pa): and T0: an intake valve upstream temperature (for example, an intake manifold temperature Tm) (K).

VEL realizing volume flow ratio TQH0VEL is obtained by dividing the air amount passing through intake valve 105 by engine rotation speed Ne and discharge amount VOL#. Therefore, it can be also represented by equations (3) and (4).

At choke:

$$TQH0VEL = \frac{Cd \cdot Av \cdot P0}{Ne \cdot VOL\# \cdot \sqrt{R \cdot T0}} \sqrt{\gamma} \left(\frac{2}{\gamma-1}\right)^{\frac{\gamma+1}{2(\gamma-1)}} \quad (3)$$

At no choke:

$$TQH0VEL = \frac{Cd \cdot Av \cdot P0}{Ne \cdot VOL\# \cdot \sqrt{R \cdot T0}} \left(\frac{Pc}{P0}\right)^{\frac{1}{\gamma}} \sqrt{\frac{2\gamma}{\gamma-1}\left(1-\left(\frac{Pc}{P0}\right)^{\frac{\gamma-1}{\gamma}}\right)} \quad (4)$$

Consequently, if valve upstream temperature Tm, valve upstream pressure Pm and cylinder pressure Pc have been already known, Cd·Av/(Ne·VOL#) is calculated to be converted into A·Cd/N/V characteristic, so that state amount VACDNV equivalent to valve opening area (Av) can be obtained. Therefore, in this embodiment, a table TVACDN as shown in the figure has been previously prepared, and by retrieving this table, based on VEL realizing volume flow ratio TQH0VEL, the conversion into A·Cd/N/V characteristic is performed. Note, the table TVACDNV is prepared in the following manner.

Namely, since VEL realizing volume flow ratio TQH0VEL can be determined, at the choke time, from the equation (3) as a value corresponding to Cd·Av/(Ne·VOL#) and a differential pressure ratio (Pc/P0) between fore and after the intake valve, and can be determined, at the no choke time, from the equation (4) as a value proportional to Cd·Av/(Ne·VOL#), the map is prepared by obtaining a correlation between TQH0VEL and Cd·Av/(Ne·VOL#) by the simulation, experiment or the like.

Then, thus obtained VADCNV is multiplied by engine rotation speed Ne at C part, and further multiplied by discharge amount VOL# at D part, to calculate a flow amount characteristic TVELAA0 (=Av·Cd). This TVELAA0 corresponds to the opening area basically requested for the intake valve (to be referred to as basic requested valve opening area hereafter).

At E part, a VTC based correction is performed on basic requested valve opening area TVELAA0. Specifically, basic requested valve opening area TVELAA0 is divided by valve timing based correction value KHOSIVC corresponding to closing timing of intake valve, to calculate TVELAA1. When the valve timing (closing timing IVC) of intake valve is advanced, an effective cylinder volume is decreased so that the volume flow ratio is reduced even in the same valve opening area. In order to cope with this, basic requested valve opening area TVELAA0 is corrected. The setting of valve timing based correction value KHOSIVC will be described later (refer to FIG. 16).

At F part, TVELAA1 calculated at E part is corrected corresponding to the upstream pressure of intake valve 105 (to be simply referred to as valve upstream pressure hereafter). Specifically, TVELAA1 is multiplied by valve upstream pressure based correction value KMANIP, to calculate TVELAA2. The volume flow ratio is changed due to a negative pressure generated in accordance with throttle opening. The valve opening area corresponding to such a change is obtained.

At the time of throttle-less control in which throttle valve 103b is fully opened, since the valve upstream pressure equals to the atmospheric pressure, the correction corresponding to the upstream pressure is unnecessary. However, actually, throttle valve 103b is throttled in response to a request of negative pressure for purging and the like, such a correction is necessary. The setting of this valve upstream pressure based correction value KMANIP will be described later (refer to FIG. 17).

At G part, TVELAA2 calculated at F part is corrected corresponding to engine rotation speed Ne. Specifically, TVELAA2 is divided by a VEL opening area rotating correction value KHOSNE, to calculate TVELAA. From the property of variable valve mechanism (VEL) 112, an inertial force is increased due to the increase of engine rotation speed Ne, resulting in that the valve lift amount (valve opening area) is increased by the inertial force even in the same VEL operating angle. Therefore, the increased portion is corrected. Note, VEL opening area rotating correction value KHOSNE used for such a correction is calculated by retrieving, at g1 part, a table TKHOSNE as shown in the figure based on engine rotation speed Ne.

At H part, using a table TTGVEL0 as shown in the figure, target valve opening area TVELAA is converted into a VEL operating angle TGVEL0. In the table TTGVEL0, a relation between the valve operating angle (lift amount) and the valve opening area has been previously obtained.

Target valve opening area TVELAA is calculated as the flow amount characteristic including valve flow loss coefficient Cd, as a matter of form. However, since valve flow loss coefficient Cd is determined based on the valve operating angle (lift amount) in this embodiment, the conversion table TTGVEL0 is set inclusive of valve flow loss coefficient Cd, to directly calculate target valve operating angle TGVEL0 based on the flow amount characteristic equivalent to the valve opening area (that is, target valve opening area TVELAA).

Figure 15:
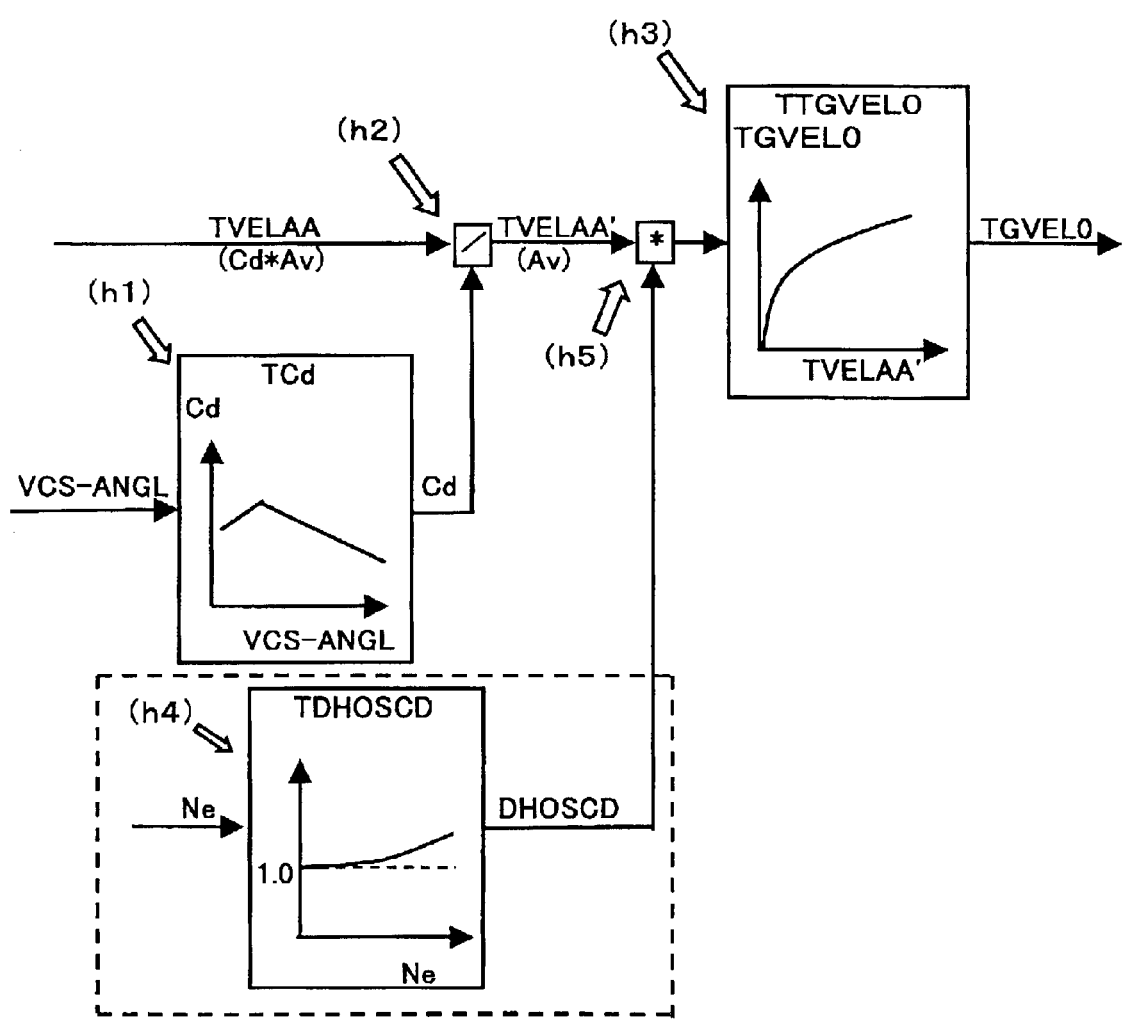

As shown in FIG. 15 (corresponding to H part), valve flow loss coefficient Cd may be calculated by retrieving a table TCd based on valve operating angle (VCS-ANGL) (at h1 part), a valve opening area TVELAA' may be calculated by dividing target valve opening area (that is, the flow amount characteristic equivalent to valve opening area) TVELAA by valve flow loss coefficient Cd (at h2 part), and then target operating angle TGVEL0 may be calculated based on valve opening area TVELAA' (h3 part).

In such a case, since valve flow loss coefficient Cd is changed in accordance with the flow amount at the time, the correction according to engine rotation speed Ne may be performed. Specifically, as indicated by dotted line in the figure, a valve flow loss dynamic correction coefficient DHOSCD is calculated by retrieving a table TDHOSCD based on engine rotation speed Ne (at h4 part), to multiply this on TVELAA' (at h5 part). Thereby, valve flow loss coefficient Cd is corrected according to engine rotation speed Ne. Valve flow loss dynamic correction coefficient DHOSCD may be directly multiplied on valve flow loss coefficient Cd.

Then, at I part, VEL operating angle TGVEL0 converted at H part is compared with an upper limit VEL operating angle (upper limit valve operating characteristic) VELHLMT of variable valve mechanism (VEL) 112, to set a target VEL operating angle TGVEL. Specifically, as shown in the figure, if TGVEL0≧VELHLMT, VELHLMT is set as target VEL operating angle TGVEL. If TGVEL0<VELHLMT, TGVEL0 is set as target VEL operating angle TGVEL.

This is because, since the accuracy of intake air amount control by variable valve mechanism (VEL) 112 is degraded under a state where there is no substantial differential pressure ratio between fore and after the valve (that is, intake valve 105 is almost fully opened), the upper limit value of valve operating characteristic is set to prevent the accuracy degradation and also a valve operating characteristic capable of ensuring the volume efficiency is set as much as possible.

Accordingly, upper limit VEL operating angle VELHLMT is set as a maximum operating angle capable of maintaining the accuracy of intake air amount control.

Consequently, it is possible to maintain the high volume efficiency while ensuring the accuracy of intake air amount control mainly by variable valve mechanism (VEL) 112.

Maximum VEL operating angle VELHLMT is calculated by retrieving, at i1 part, a table TVELHLMT as shown in the figure based on engine rotation speed Ne.

As a result, control unit (C/U) 114 feedback controls actuator 121, so that an actual VEL operating angle (VCS-ANGL) of control shaft 16 in variable valve mechanism (VEL) 112 reaches target VEL operating angle (TGVEL).

(c-2) Calculation of Valve Timing Based Correction Value KHOSIVC

The calculation of valve timing based correction value KHOSIVC to be used at E part in FIG. 14 will be described referring to a control block diagram in FIG. 16.

Figure 16:
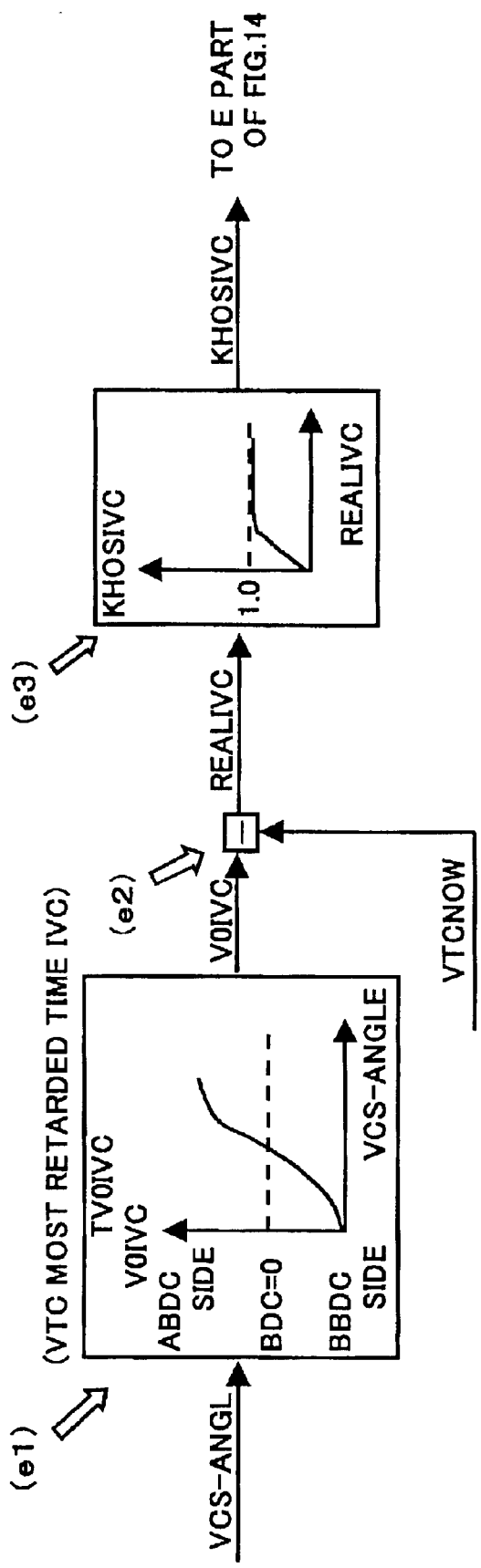

In FIG. 16, at e1 part, by referring to a table TV0IVC as shown in the figure, an angle V0IVC in intake valve closing timing at the time when variable valve timing mechanism (VTC) 113 does not operate, that is, at the VTC most retarded time, is obtained based on operating angle VCS-ANGL of variable valve mechanism (VEL) 112.

Next, at e2 part, an actual IVC angle REALIVC is obtained by subtracting a rotation phase VTCNOW of intake side camshaft 13 from V0IVC.

Then, at e3 part, by retrieving a table TKHOSIVC as shown in the figure based on actual IVC angle REALIVC, a valve timing based correction value KHOSIVC is set to be output to E part in FIG. 14.

Note, valve timing based correction value KHOSIVC includes: (1) a static correction (correction of decreased portion of effective cylinder volume); (2) a dynamic correction (considering that, during engine rotating, air amount of the effective cylinder equivalent volume at IVC cannot be sucked, the effective cylinder equivalent volume is made variable by the valve lift amount within a range of 0 to 100%); and (3) a correction of valve overlap (the correction corresponding to opening timing IVO of intake valve 105). (Namely, the table TKHOSIVC is set inclusive of the factors of (1) to (3).)

(c-3) Setting of Valve Upstream Pressure Based Correction Value KMANIP

Next, there will be described the setting of valve upstream pressure based correction value KMANIP to be used at F part in FIG. 14, referring to a control block diagram in FIG. 17.

Figure 17:
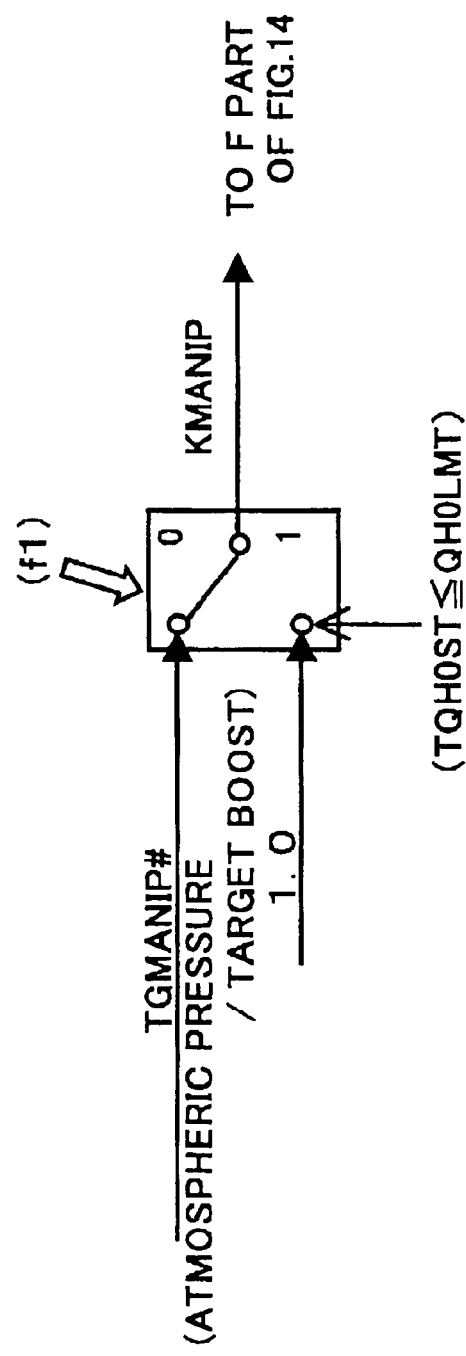

In FIG. 17, it is required to establish the following equations (5) and (6) from the equation of the one-dimensional steady flow of compressed fluid, in order to keep the air amount passing through intake valve 105 constant even if the valve upstream pressure (intake manifold pressure) is changed (Pm0 to Pm1) by throttling throttle valve 103b.

At choke:

$$\frac{Cd0 \cdot Av0 \cdot Pm0}{\sqrt{R \cdot Tm}} \sqrt{\gamma} \left(\frac{2}{\gamma-1}\right)^{\frac{\gamma+1}{2(\gamma-1)}} = \qquad (5)$$

$$\frac{Cd1 \cdot Av1 \cdot Pm1}{\sqrt{R \cdot Tm}} \sqrt{\gamma} \left(\frac{2}{\gamma-1}\right)^{\left(\frac{\gamma+1}{2(\gamma-1)}\right)}$$

At no choke:

-continued $$\frac{Cd0 \cdot Av0 \cdot Pm0}{\sqrt{R \cdot Tm}} \left(\frac{Pc0}{Pm0}\right)^{\frac{1}{\gamma}} \sqrt{\frac{2\gamma}{\gamma-1}\left(1-\left(\frac{Pc0}{Pm0}\right)^{\frac{\gamma-1}{\gamma}}\right)} = \tag{6}$$

$$\frac{Cd1 \cdot Av1 \cdot Pm1}{\sqrt{R \cdot Tm}} \left(\frac{Pc1}{Pm1}\right)^{\frac{1}{\gamma}} \sqrt{\frac{2\gamma}{\gamma-1}\left(1-\frac{Pc1}{Pm1}\right)^{\frac{\gamma-1}{\gamma}}}$$

In the above equations, Pm0: valve upstream pressure at the time when throttle valve is fully opened (intake manifold pressure substantially equals atmospheric pressure), Pm1: valve upstream pressure at the time of target Boost (intake manifold pressure), Pc0: valve downstream pressure at the time when throttle valve is fully opened (substantially equals cylinder pressure), Pc1: valve downstream pressure at the time of target Boost (substantially equals cylinder pressure), Av0: intake valve opening area at the time when throttle valve is fully opened, and Av1: intake valve opening area at the time of target Boost.

Accordingly, valve upstream pressure based correction value KMANIP relative to valve opening area Av0 at the time when the valve upstream pressure equals the atmospheric pressure (Pm0) is represented by the following equations (7) and (8).

At choke time:

$$KMANIP = \frac{Cd1 \cdot Av1}{Cd0 \cdot Av0} = \frac{Pm0}{Pm1} \tag{7}$$

At no choke:

$$KMANIP = \frac{Cd1 \cdot Av1}{Cd0 \cdot Av0} = \frac{Pm0\left(\frac{Pc0}{Pm0}\right)^{\frac{1}{\gamma}}\sqrt{\left(1-\left(\frac{Pc0}{Pm0}\right)^{\frac{\gamma-1}{\gamma}}\right)}}{Pm1\left(\frac{Pc1}{Pm1}\right)^{\frac{1}{\gamma}}\sqrt{\left(1-\left(\frac{Pc1}{Pm1}\right)^{\frac{\gamma-1}{\gamma}}\right)}} \tag{8}$$

Consequently, valve upstream pressure based correction value KMANIP is primarily determined by the atmospheric pressure/target Boost (manifold pressure) at the choke time. Further, since it is considered that (Pc0/Pm0) substantially equals (Pc1/Pm1), the atmospheric pressure/target Boost becomes dominative even at no choke time. In either of the cases, valve upstream pressure based correction value KMANIP can be made the atmospheric pressure/target Boost.

Therefore, in this embodiment, at f1 part in FIG. 17, the atmospheric pressure/target Boost (target manifold pressure) is set by a single point constant as valve upstream pressure based correction value KMANIP, to be output to F part in FIG. 14. Note, in the embodiment, since the target Boost is made constant (88 KPa), a fixed value (101.3 KPa/88 KPa) is output as valve upstream pressure based correction value KMANIP.

However, in the case where target volume flow TQH0ST is equal to or less than minimum volume flow ratio QH0LMT, that is in the case where minimum volume flow ratio QH0LMT is selected at A part in FIG. 14, regardless of the valve upstream pressure, 1.0 is output as valve upstream pressure based correction value KMANIP so that the valve operating angle equivalent to minimum volume flow ratio QH0LMT can be finally obtained (correction is not performed).

(d) Calculation of Target Throttle Opening TDTVO

Basically, the intake air amount control is performed by the control of variable valve mechanism (VEL) 112. However, in order to generate a requested negative pressure or in order to assist the intake air amount control by variable valve mechanism (VEL) 112, the throttle control is executed. The target throttle opening calculating section "c" calculates a target throttle opening TDVTC in the following manner.

Firstly, when intake valve 105 has a standard valve operating characteristic (in this embodiment, the valve operating characteristic of when variable valve mechanism (VEL) 112 does not operate), an opening area TVOAA0 of throttle valve 103b required for generating a predetermined negative pressure (to be referred to as standard requested throttle opening area hereafter) is calculated, and corrected in accordance with an actual change in valve operating characteristic of (controlled) intake valve 105, to be made a target throttle opening area TVOAA. Then, target throttle opening TDTVO is calculated based on target throttle opening area TVOAA. There will be described the calculation in the target throttle opening calculating section "d", based on FIG. 18 to FIG. 20.

(d-1) Setting of Target Throttle Opening TDTVO

Figure 18:
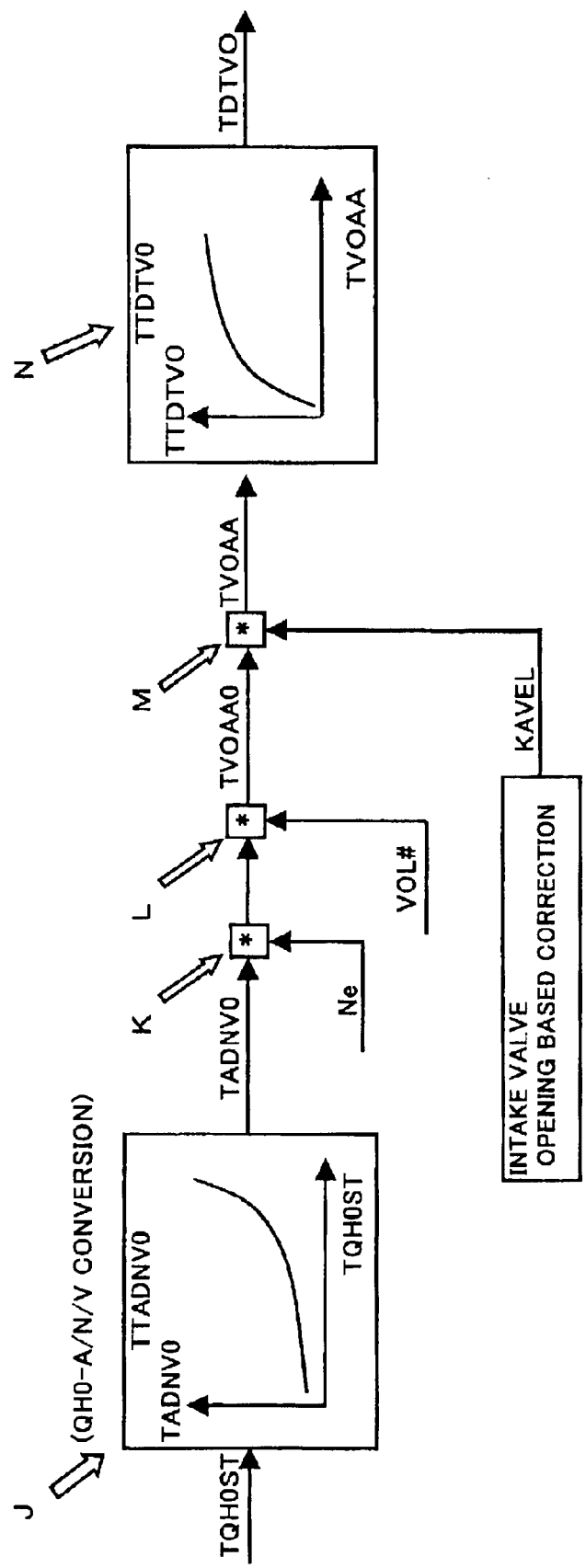

In FIG. 18, at J part, a state amount TADNV0 equivalent to an opening area At of throttle valve 103b requested at the standard valve operating characteristic is calculated. Specifically, TADNV0 is calculated by retrieving a conversion table TTADNV0 as shown in the figure, based on target volume flow ratio TQH0ST. This state amount TADNV0 is represented by TADNV0=At/(Ne·VOL#) when the throttle opening area is At, the engine rotation speed is Ne, and the discharge amount (cylinder volume) is VOL#.

Then, calculated TADNV0 is multiplied by engine rotation speed Ne at K part, and further multiplied by discharge amount VOL# at L part, to calculate standard requested throttle opening area TVOAA0.

At M part, a correction according to a change in operating characteristic of intake valve 105 is performed on calculated standard requested throttle opening area TVOAA0. Specifically, standard requested throttle opening area TVOAA0 is multiplied by an intake valve opening based correction value KAVEL, to be made target throttle opening area TVOAA. The setting of intake valve opening based correction value KAVEL will be described later (refer to FIG. 19).

At N part, target throttle opening TDTVO is set by retrieving a conversion table TTDTVO as shown in the figure, based on calculated target throttle opening area TVOAA.

As a result, control unit (C/U) 114 controls electronically controlled throttle 104 so that an actual opening of throttle valve 104 becomes target throttle opening TDTVO.

(d-2) Calculation of Intake Valve Opening Based Correction Value KAVEL

Next, the calculation of intake valve opening based correction value KAVEL to be used at F part in FIG. 18 will be described referring to a control block diagram in FIG. 19.

Figure 19:
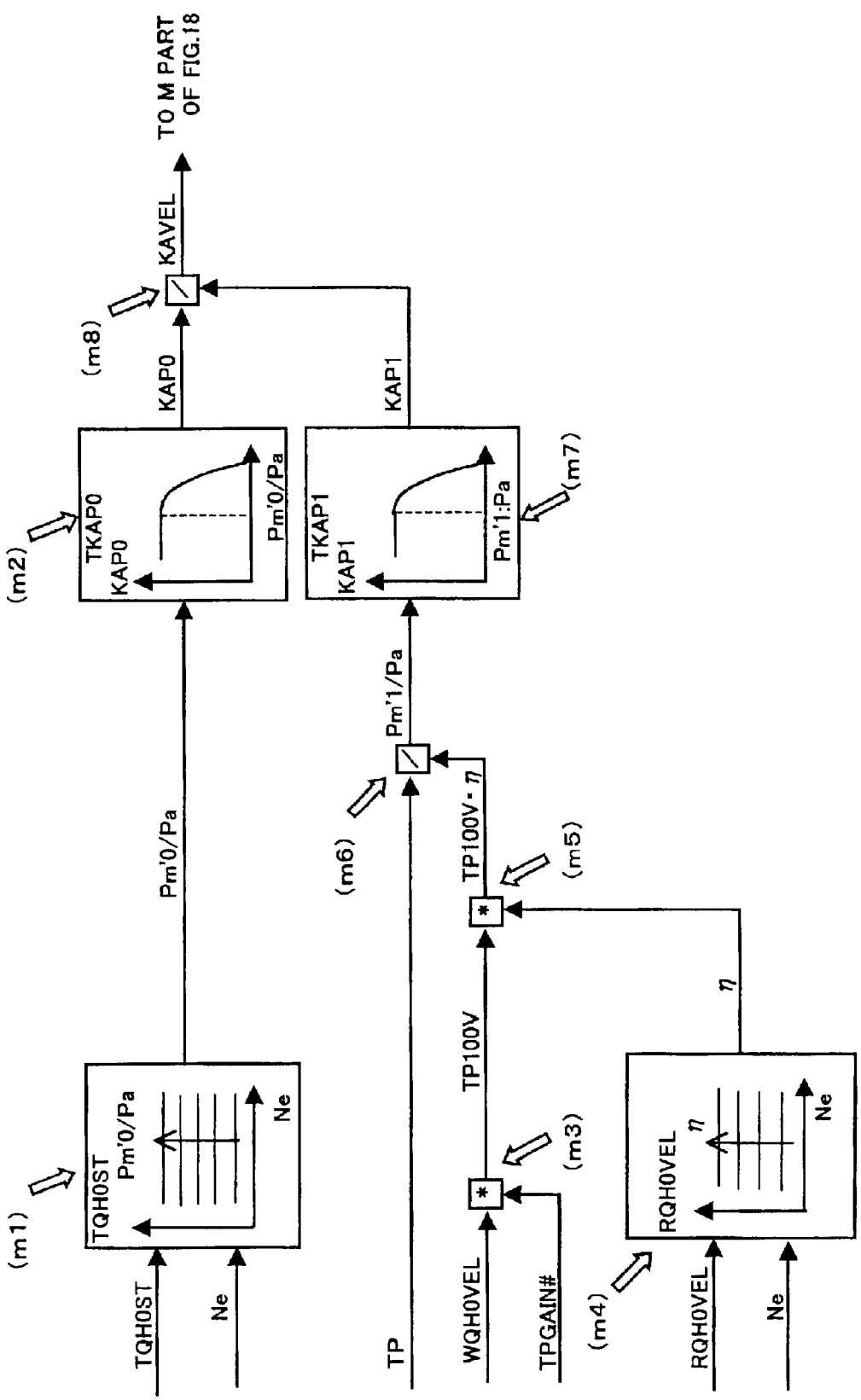

In FIG. 19, at first, an air flow amount Qth (t) (kg/sec) passing through throttle valve 103b can be represented by the following equations (9) and (10) from the equation of the one dimensional steady flow of compressed fluid.

At choke time: $\dfrac{Pc}{Pm} \le \left(\dfrac{2}{\gamma+1}\right)^{\frac{\gamma}{\gamma-1}}$ -continued $$Qth(t) = \frac{At \cdot Pa}{\sqrt{R \cdot Ta}} \sqrt{\gamma \left(\frac{2}{\gamma-1}\right)^{\frac{\gamma+1}{2(\gamma-1)}}} \quad (9)$$

At no choke:

$$Qth(t) = \frac{At \cdot Pa}{\sqrt{R \cdot Ta}} \left(\frac{Pm}{Pa}\right)^{\frac{1}{\gamma}} \sqrt{\frac{2\gamma}{\gamma-1}\left(1 - \left(\frac{Pm}{Pa}\right)^{\frac{\gamma-1}{\gamma}}\right)} \quad (10)$$

In the above equations, Pa: atmospheric pressure (Pa), Pm: manifold pressure (Pa), Ta: outside air temperature, and At: throttle opening area (m$_2$).

Thereby, in order to keep the air amount constant even if the operating characteristic of intake valve 105 is changed (from state 0 to state 1), the following equation (11) is required to be established.

$$\frac{At0 \cdot Pa}{\sqrt{R \cdot Ta}}\left(\frac{Pm'0}{Pa}\right)^{\frac{1}{\gamma}} \sqrt{\frac{2\gamma}{\gamma-1}\left(1-\left(\frac{Pm'0}{Pa}\right)^{\frac{\gamma-1}{\gamma}}\right)} = \quad (11)$$

$$\frac{At1 \cdot Pa}{\sqrt{R \cdot Ta}}\left(\frac{Pm'1}{Pa}\right)^{\frac{1}{\gamma}} \sqrt{\frac{2\gamma}{\gamma-1}\left(1-\frac{Pm'1}{Pa}\right)^{\frac{\gamma-1}{\gamma}}}$$

In the above equation, Pa: atmospheric pressure, Ta: outside air temperature, Pm'0: intake manifold pressure at standard valve operating characteristic, Pm'1: intake manifold pressure at the time when variable valve mechanism (VEL) operates, At0: throttle opening area at standard valve operating characteristic, and At1: throttle opening area at the time when variable valve mechanism (VEL) operates.

Accordingly, intake valve opening based correction value KAVEL relative to throttle opening area At0 at standard valve operating characteristic is represented by the following equation (12).

$$KAVEL = \frac{At1}{At0} = \frac{\left(\frac{Pm'0}{Pa}\right)^{\frac{1}{\gamma}} \sqrt{\left(1-\left(\frac{Pm'0}{Pa}\right)^{\frac{\gamma-1}{\gamma}}\right)}}{\left(\frac{Pm'1}{Pa}\right)^{\frac{1}{\gamma}} \sqrt{\left(1-\left(\frac{Pm'1}{Pa}\right)^{\frac{\gamma-1}{\gamma}}\right)}} \quad (12)$$

Therefore, in the embodiment, at m1 part in FIG. 19, a pressure ratio (Pm'0/Pa) at standard valve operating characteristic is obtained by referring to a map previously allotted in performance as shown in the figure, based on target volume flow ratio TQH0ST and engine rotation speed Ne.

Then, at m2 part, a coefficient KAP0 is calculated by retrieving a table TBLKAP0 as shown in the figure, based on the pressure ratio (Pm'0/Pa) at standard valve operating characteristic. Note, this coefficient KAP0 can be represented by the following equation (13) and corresponds to a value of the numerator in the equation (12).

$$KAP0 = \left(\frac{Pm'0}{Pa}\right)^{\frac{1}{\gamma}} \sqrt{\left(1-\left(\frac{Pm'0}{Pa}\right)^{\frac{\gamma-1}{\gamma}}\right)} \quad (13)$$

Further, a pressure ratio (Pm'1/Pa) at the time when variable valve mechanism (VEL) 112 operates is calculated in the following manner.

Firstly, an air amount (actual intake air amount) Qacyl sucked into cylinder can be represented by the following equation (14) assumed that a new air rate is η.

$$Qacyl = \frac{VOL}{R \cdot Ta} \cdot \eta \cdot Pm'1 \quad (14)$$

Thus, the pressure ratio (Pm'1/Pa) becomes the following.

$$\frac{Pm'1}{Pa} = \frac{Qacyl \cdot R \cdot Ta}{VOL \cdot \eta \cdot Pa} = \frac{TP}{\eta} \cdot \frac{R \cdot Ta}{VOL \cdot Pa} = \frac{TP}{\eta \cdot TP100V} \quad (15)$$

In the above equation, "TP" is an air amount (actual intake air amount) Qacyl sucked in the cylinder, "TP100V" is an air amount sucked into the cylinder at the time when throttle valve 103b is fully opened and is calculated by TP100V=(VOL·Pa)/(R·Ta). Further, "VOL" is an effective cylinder volume at each valve operating characteristic of intake valve 105.

Accordingly, by obtaining TP, TP100 and new air rate η, pressure ratio (Pm'1/Pa) can be calculated without the necessity of detecting intake manifold pressure Pm'.

Therefore, in the embodiment, at m3 part, a conversion constant TPGAIN# is multiplied on a ratio WQH0VEL of volume flow passed through intake valve 105 at each operating characteristic at the time when throttle valve 103b is fully opened, and the unit conversion is performed to calculate TP100V. The calculation of ratio WQH0VEL of passed volume flow will be described later (refer to FIG. 20).

Further, at m4 part, new air rate η is calculated by referring to a map previously allotted in performance as shown in the figure, based on a ratio RQH0VEL of volume flow passed through intake valve 105 (actual engine volume flow ratio) at each operating characteristic at the time when throttle valve 103b is throttled (at the time when the valve upstream pressure is generated) and engine rotation speed Ne. The calculation of actual engine volume flow ratio RQH0VEL will be described later (refer to FIG. 20).

However, new air rate η is not limited to the one calculated as above, and may be estimated based on operating conditions, for example.

Then, at m5 part, actual intake air amount "TP" is multiplied by new air rate η, to calculate "TP100V·η", and further, at m6 part, "TP/(TP100V·η)" is calculated. The resultant corresponds to pressure ratio (Pm'1/Pa) at the time when variable valve mechanism (VEL) 112 operates.

Thus, in this embodiment, pressure ratio (Pm'1/Pa) between manifold pressure and atmospheric pressure can be obtained without the necessity of detecting intake manifold pressure Pm. In the case where a pressure sensor detecting intake manifold pressure Pm is provided, pressure ratio (Pm'1/Pa) may be calculated using a detection value of the pressure sensor.

Further, at m7 part, a coefficient KAP1 is calculated by retrieving a table TKPA1 as shown in the figure, based on pressure ratio (Pm'1/Pa) at the time when variable valve mechanism (VEL) 112 operates. This coefficient KAP1 can be represented by the following equation (16) and corresponds to a value of the denominator in the equation (12).

$$KAP1 = \left(\frac{Pm'1}{Pa}\right)^{\frac{1}{\gamma}} \sqrt{\left(1-\left(\frac{Pm'1}{Pa}\right)^{\frac{\gamma-1}{\gamma}}\right)} \quad (16)$$

At m8 part, by dividing coefficient KAP0 calculated at m2 part by coefficient KAP1 calculated at m7 part, to set intake valve opening based correction value KAVEL, and the set value is output to M part in FIG. 17.

(d-3) Calculations of Ratio WQH0VEL of Volume Flow Passed through Intake Valve 105 at the Time When Throttle Valve 103b is Fully Opened, and of Actual Engine Volume flow Ratio RQH0VEL These calculations are performed by obtaining the opening area of intake valve 105 based on the operating angles of variable valve mechanism (VEL) 112 and variable valve timing mechanism (VTC) 114 and converting the opening area to the volume flow ratio.

Figure 20:
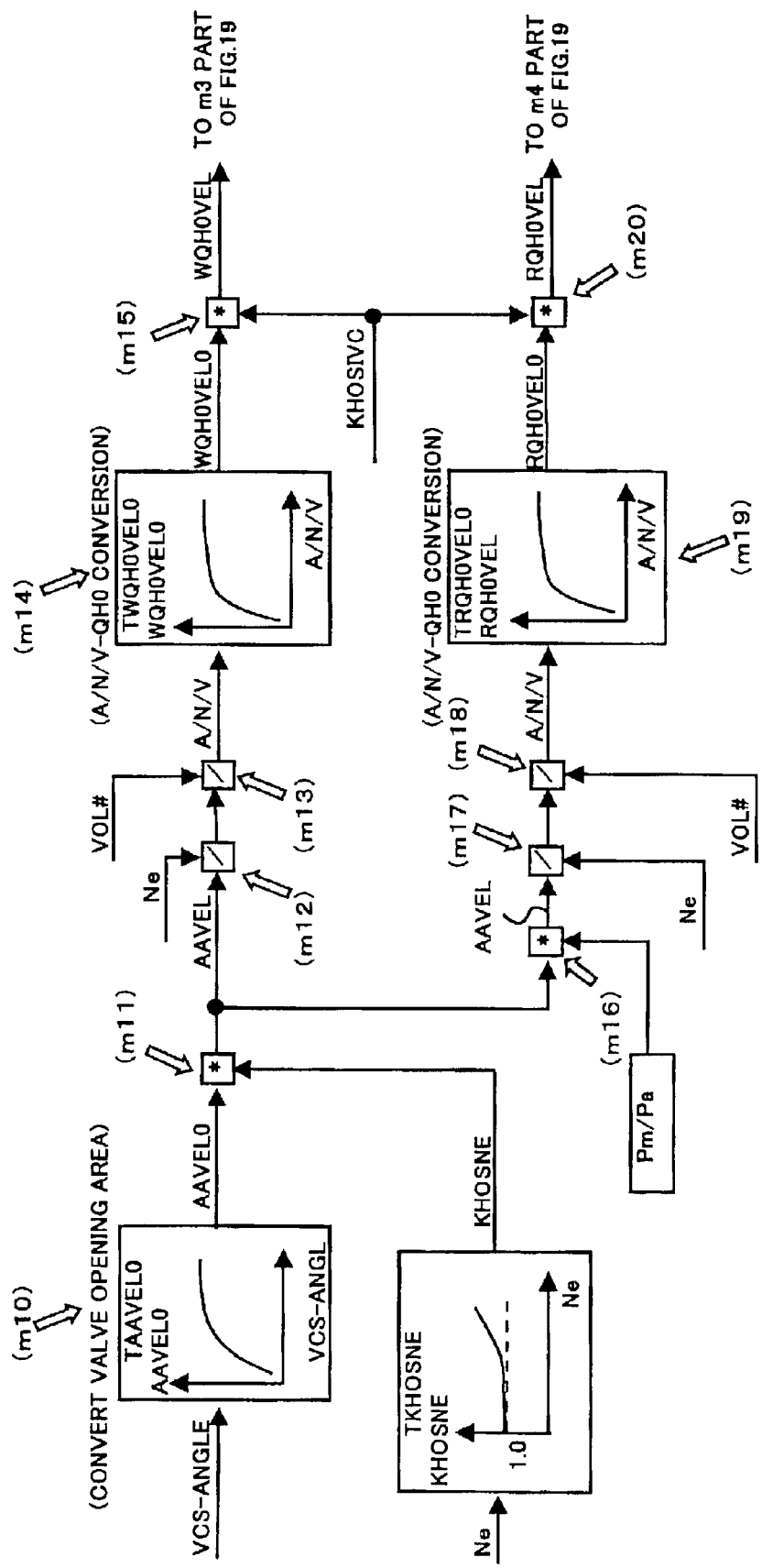

In FIG. 20, at m10 part, an opening area AAVEL0 of intake valve 105 is calculated by retrieving a table TAAVEL0 as shown in the figure, based on operating angle VCS-ANGL of variable valve mechanism (VEL) 112.

At m11 part, in the same manner as G part in FIG. 14, VEL opening area is rotatingly corrected according to engine rotation speed Ne, to calculate AAVEL.

Calculated AAVEL is divided by engine rotation speed Ne at m12 part, and further divided by discharge amount (cylinder volume) VOL# at m13 part, to be made an A/N/V characteristic.

At m14 part, a table TWH0VEL0 as shown in the figure is retrieved, to convert the A/N/V characteristic into a volume flow ratio WH0VEL0.

Then, at m15 part, in the same manner as E part in FIG. 14, the VTC based correction is performed to calculate ratio WQH0VEL of volume flow passed through intake valve 105 at the time when throttle valve 103b is fully opened, and the resultant is output to m3 part in FIG. 19.

On the other hand, at m16 part, AAVEL calculated at m11 part is multiplied by the ratio between actual intake manifold pressure Pm and atmospheric pressure Pa (Pm/Pa), to calculate AAVEL'.

Then, this AAVEL' is divided by engine rotation speed Ne at m17 part, and further divided by discharge amount (cylinder volume) VOL# at m18 part, to be made the A/N/V characteristic.

At m19 part, in the same manner as m14 part, a table TRH0VEL0 as shown in the figure is retrieved to convert the A/N/V characteristic into a volume flow ratio RH0VEL0.

Then, at m20 part, in the same manner as m15 part (E part in FIG. 14), the VTC based correction is performed to calculate the actual volume flow ratio RQH0VEL, and the resultant is output to m4 part in FIG. 19.

As described in the above, in this embodiment, a control in which variable valve mechanism (VEL) 112 and electronically controlled throttle 104 are cooperative with each other is performed. Therefore, an intake air amount control (torque control) mainly by variable valve mechanism (VEL) 112 can be executed with high accuracy.

Next, other embodiment (second embodiment) of intake air amount control to be executed by control unit (C/U) 114 will be described with reference to block diagrams of FIG. 21 to FIG. 24.

In this embodiment, intake valve 105 is controlled to a target valve operating characteristic. While, in a total opening area (an integrated value of opening areas) obtained based on the target valve operating characteristic, since the opening area during valve overlap period is an ineffective portion where air is not newly sucked, the total opening area is corrected with a correction value according to the valve overlap to be made a total opening area (effective opening area) where air is newly sucked, so that the total opening area (effective opening area) indicative of intake air amount actually controlled by intake valve is compared with the target intake air amount to set a target opening of throttle valve 103b.

Figure 21:
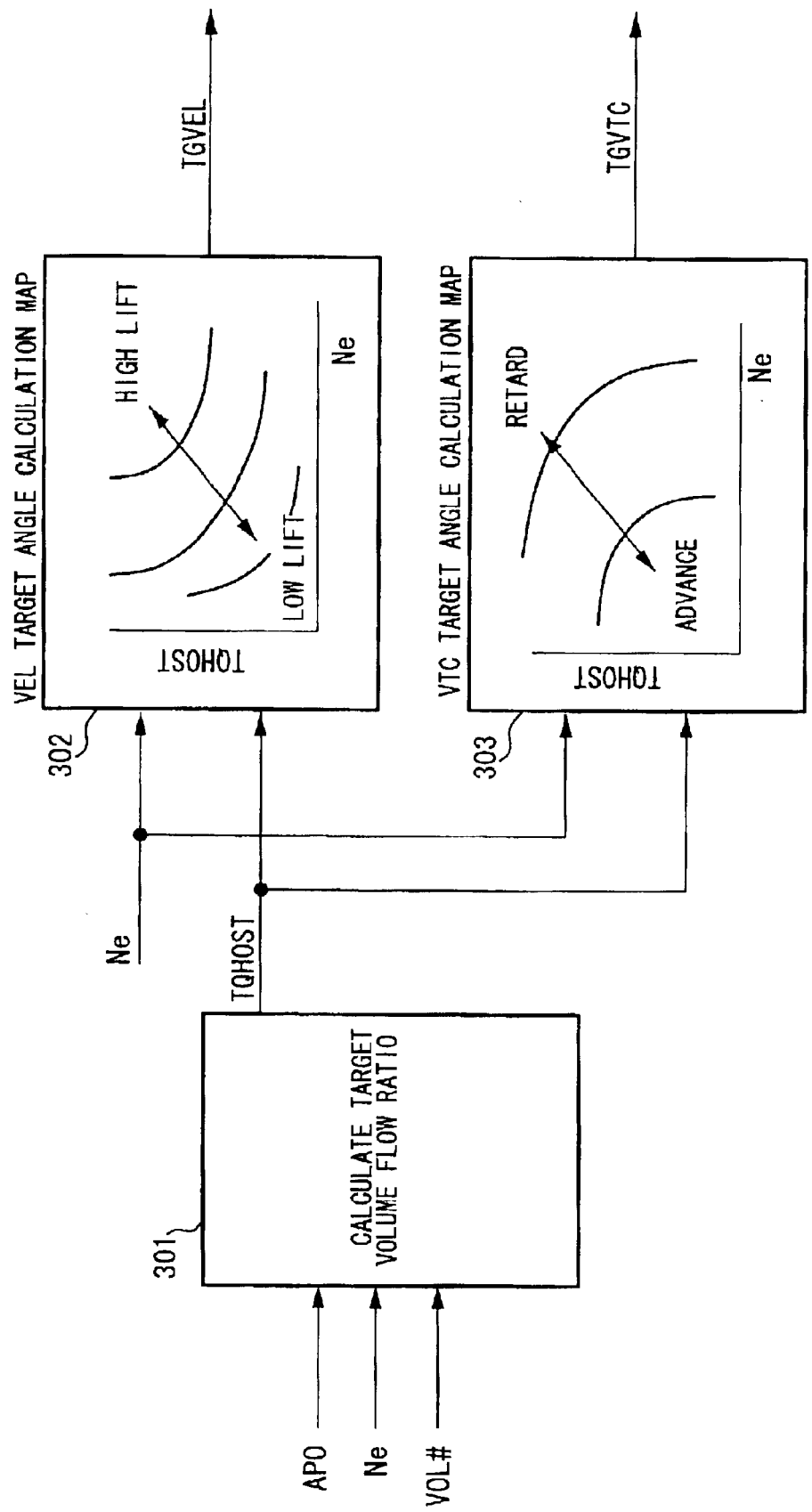

In FIG. 21, a target volume flow ratio calculating section 301 calculates a target volume flow ratio TQH0ST (target intake air amount) of engine 101, in the same manner as the target volume flow ratio calculating section "a" in the first embodiment.

In a VEL target angle calculating section 302, a target operating angle TGVEL (target lift amount) of control shaft 16 in variable valve mechanism (VEL) 112 is calculated by referring to a map as shown in the figure, based on target volume flow ratio TQH0ST and engine rotation speed Ne. Here, in this embodiment, as with the VEL target operating angle calculating section "c" in the first embodiment, the larger target volume flow ratio TQH0ST is and the higher engine rotation speed Ne is, the target operating angle is set such that the lift amount becomes larger.

However, due to a minimum limit of lift amount, at the side of low load and low rotation, a lift amount larger than a requested amount corresponding to target volume flow ratio TQH0ST is set. Such an excess portion is corrected by the throttle control of throttle valve 103 as described later.

In a VTC target angle calculating section 303, as with the VTC target angle calculating section "b" in the first embodiment, a target phase angle TGVTC (target advance amount) in variable valve timing mechanism (VTC) 113 is calculated based on target volume flow ratio TQH0ST and engine rotation speed Ne. Here, the larger target volume flow ratio TQH0ST is and the higher engine rotation speed Ne is, the target valve timing is retarded.

Then, target operating angle TGVEL is input to a valve total opening area calculating section 304, to be converted into the total opening area of intake valve 105 of when variable valve mechanism (VEL) 112 is controlled based on target operating angle TGVEL. Note, the total opening area is an integral value of valve opening area during a closing period of intake valve 105.

Figure 22:
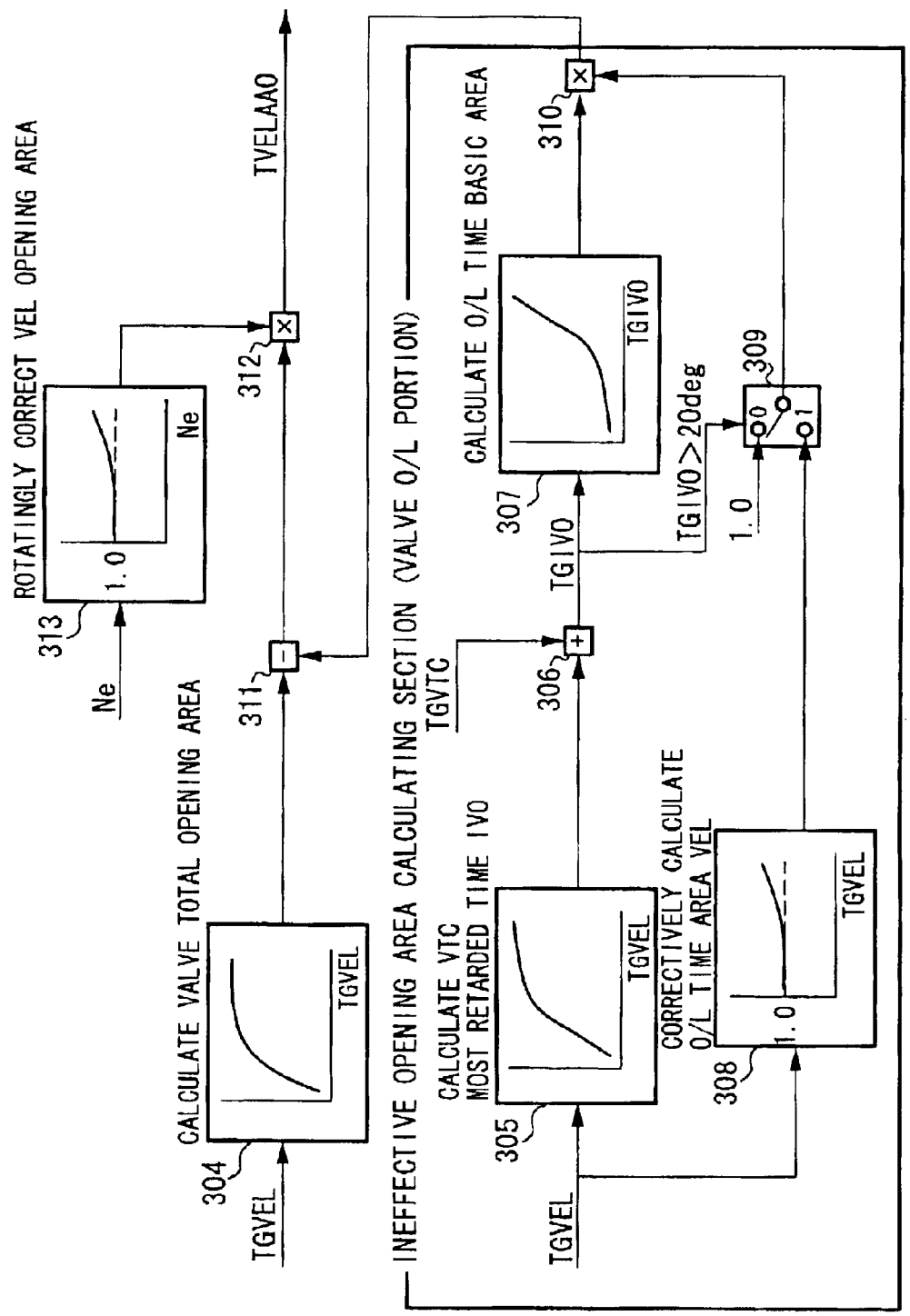

On the other hand, in FIG. 22, in a VTC most retarded time IVO calculating section 305, variable valve mechanism (VEL) 112 is controlled based on target operating angle TGVEL, and also opening timing IVO of intake valve 105 assuming that the valve timing is controlled to the most retarded side by variable valve timing mechanism (VTC) 113, is calculated.

Opening timing IVO calculated in VTC most retarded time IVO calculating section 305 is added with a target phase angle TGVTC by an adder 306. Thereby, opening timing TGIVO of when the operating characteristic of intake valve 105 is controlled based on target operating angle TGVEL and target phase angle TGVTC, is obtained.

The opening timing TGIVO is input to an O/L time basic area calculating section 307.

In O/L time basic area calculating section 307, a basic value of opening area integral value of intake valve 105 during the valve overlap period between intake valve 105 and exhaust valve 107 is obtained based on opening timing TGIVO, since the closing timing of exhaust valve 107 is fixed. The basic value is obtained in conformity with the case where the valve lift amount is smallest.

Further, in an O/L time area VEL correctively calculating section 308, a correction coefficient in order to cope with a difference of opening area due to a difference of lift amount is set based on target operating angle TGVEL.

Figure 25:
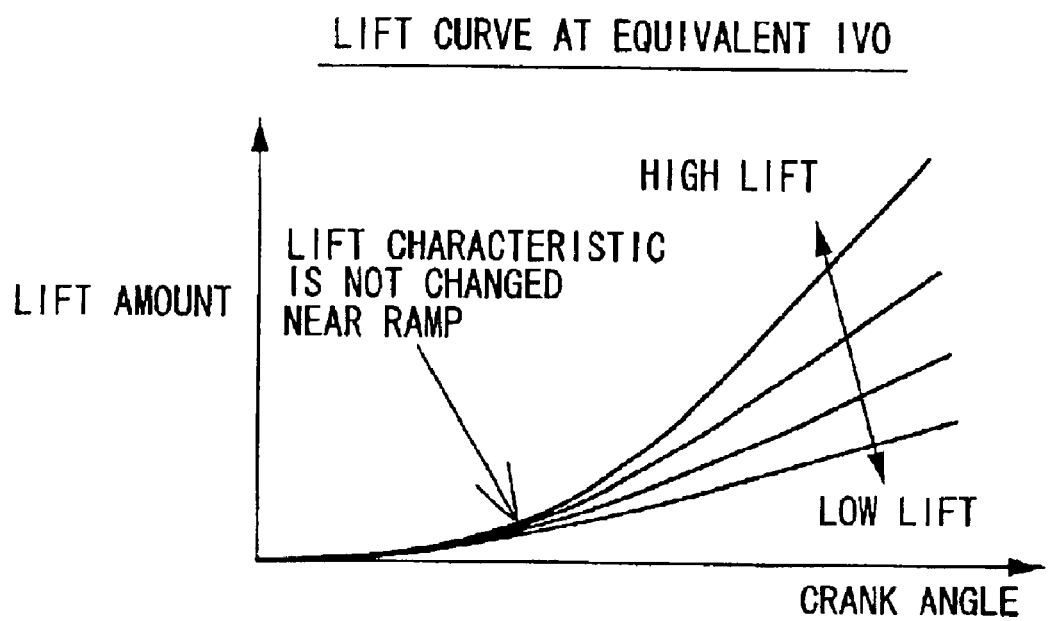
FIG. 25 is a diagram showing a lift characteristic of the intake valve.

In this embodiment, as opening timing IVO of intake valve 105 is changed, the valve lift amount is changed, and even if the valve overlap period is the same, the opening area during the overlap period becomes large as the lift amount is larger (refer to FIG. 25). Therefore, correction coefficient ($\geq 1.0$) is set to be a larger value as the operating angle (lift amount) becomes larger.

The correction coefficient calculated in O/L time area VEL correctively calculating section 308 is input to a switching output section 309. In switching output section 309, either the correction coefficient calculated in O/L time area VEL correctively calculating section 308 or 1.0 being a reference value of the correction coefficient is selectively output, depending on whether or not opening timing TGIVO (advance value from top dead center TDC to opening timing IVO) exceeds a predetermined angle (for example, 20 degrees).

As described above, even if the valve overlap period is the same, the opening area of intake valve 105 during the valve overlap period is changed depending on the lift amount. However, if the valve overlap period is short, there does not occur a large difference in the opening area depending on a difference between the lift amount (refer to FIG. 25).

Therefore, in switching output section 309, when opening timing TGIVO is equal to or less than the predetermined angle and the valve overlap period is equal to or less than the predetermined angle, 1.0 being the reference value is output as the correction coefficient. When opening timing TGIVO exceeds the predetermined angle and the valve overlap period exceeds the predetermined angle, the correction coefficient calculated in O/L time area VEL correctively calculating section 308 is output.

The correction coefficient output from switching output section 309 is multiplied on the basic value of opening area integral value of intake valve 105 in the valve overlap period calculated by O/L time basic area calculating section 307.

Then, the opening area integral value in the valve overlap period being the resultant of multiplicative calculation in adder 310 is subtracted from the total opening area calculated in valve total opening area calculating section 304, and the integral value of opening area in the opening period of intake valve 105 except for the valve overlap period is obtained.

The calculation result in a subtracter 311 is output to a multiplier 312, wherein the calculation result in subtracter 311 is multiplied by the correction coefficient calculated in a VEL opening area rotating correction calculating section 313, to be output as effective opening area TVELAA0.

VEL opening area rotating correction calculating section 313 sets a larger correction coefficient (($\geq 1.0$), as engine rotation speed Ne is higher.

In variable valve mechanism (VEL) 112, as described in the first embodiment, there is a tendency that the valve lift amount becomes larger than a target due to inertial force, as engine rotation speed Ne becomes higher. Due to this, there occurs an error difference between the opening area calculated based on target operating angle TGVEL and target phase angle TGVTC, and the actual opening area. Therefore, in VEL opening area rotating correction calculating section 313, a correction coefficient is set in order to increasingly correct the opening area of intake valve 105 coping with the tendency that the valve lift amount becomes larger than the target, as engine rotation speed Ne is higher.

Figure 23:
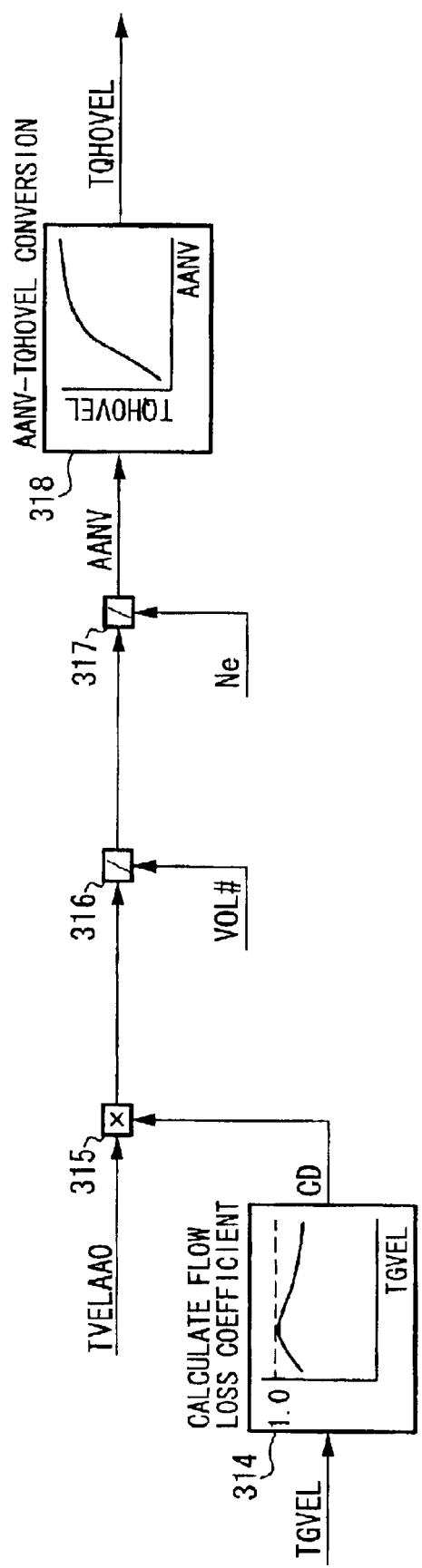

In FIG. 23, in a flow loss correction coefficient calculating section 314, a flow loss coefficient Cd is calculated based on target operating angle TGVEL (target valve lift amount).

Then, in an adder 315, effective opening area TVELAA0 is multiplied by flow loss coefficient Cd, to perform a correction coping with a difference between flow losses due to valve lift amount.

Effective opening area TVFELAA0 subjected to the correction by flow loss coefficient Cd is divided by effective discharge amount (cylinder total volume) VOL# in a divider 316, and further divided by engine rotation speed Ne in a divider 317, to be converted into a state amount AANV. Further, state amount AANV is converted into volume flow ratio TQH0VE of intake valve 105 in a conversion section 318.

Note, volume flow ratio TQH0VEL of intake valve 105 is a value on the condition of the full open state of throttle valve 103b.

Figure 24:
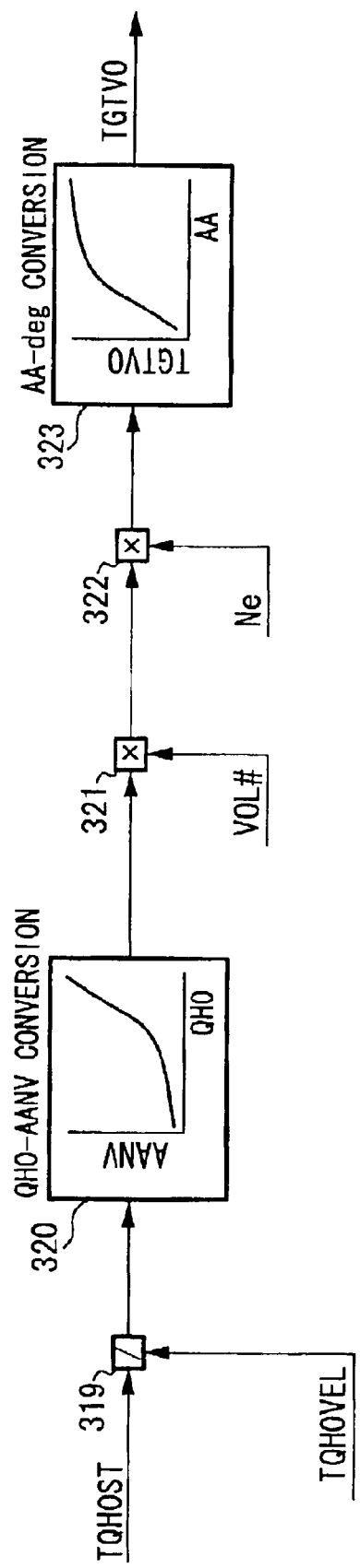

In FIG. 24, in a divider 319, target volume flow ratio TQH0ST is divided by volume flow ratio TQH0VEL, to calculate volume flow ratio QH0 required for throttle valve 103b in order to obtain target volume flow ratio TQH0ST.

Volume flow ratio QH0 required for throttle valve 103b is converted into state amount AANV in a conversion section 320, and is multiplied by effective discharge amount (cylinder total volume) VOL# in a multiplier 321 and further multiplied by engine rotation speed Ne in a multiplier 322, to be converted into opening area AA required for throttle valve 103b.

Then, opening area M is converted into an angle (opening) of throttle valve 103b in a conversion section 323, and the angle is output as target angle TGTVO so that electronically controlled throttle 104 is controlled based on target angle TGTVO.

As described above, in this embodiment, volume flow ratio TQH0VEL actually obtained with the lift amount and valve timing of intake valve 105 is converted from the effective opening area (total opening area after correction) of intake valve 105 considering the ineffective opening area during the valve overlap period. Target volume flow ratio TQH0ST is divided by volume flow ratio TQH0VEL, to obtain requested volume flow ratio QH0 of throttle valve 103b, and this requested volume flow ratio QH0 is converted into the target opening of throttle valve 103b.

Thus, the valve operating characteristic (lift amount and valve timing) of intake valve 105 is controlled based on the target intake air amount (target volume flow ratio TQH0ST), and also the intake air amount (volume flow ratio) actually obtained with the valve operating characteristic of intake valve 105 is predicted based on the valve overlap, so that the excess portion (error amount due to valve overlap) to the target intake air amount (target volume flow ratio TQH0ST) can be corrected by the throttle control of throttle valve 103b. Thereby, the control to the target intake air amount (target volume flow ratio TQH0ST) can be performed with high accuracy.

The entire contents of Japanese Patent Applications No. 2001-315386 filed Oct. 12, 2001, No. 2001-320953 filed Oct. 18, 2001, No. 2001-342176 filed Nov. 7, 2001 and No. 2001-388160 filed Dec. 20, 2001, each priority of which is claimed, are incorporated herein by reference.

What is claimed are:

1. An apparatus for controlling an intake air amount of an internal combustion engine provided with a variable valve mechanism that varies at least a valve operating characteristic of an intake valve and provided with a throttle valve driven to open and close by an actuator, comprising:

an operating condition detecting sensor detecting operating conditions of said engine;

a valve operating characteristic detecting sensor detecting said valve operating characteristic;

a control unit that sets a target intake air amount equivalent to a target torque according to the operating conditions of the engine, sets a target valve operating characteristic based on the set target intake air amount, and controls said variable valve mechanism so that an actual valve operating characteristic reaches said target valve operating characteristic; and a throttle opening sensor detecting an opening of said throttle valve, wherein said control unit sets a target throttle opening of said throttle valve based on said target intake air amount and said valve operating characteristic, to control said actuator so that an actual throttle opening reaches said target throttle opening.

2. An apparatus for controlling an intake air amount of an internal combustion engine according to claim 1, wherein said control unit sets said target intake air amount based on an accelerator opening and an engine rotation speed.

3. An apparatus for controlling an intake air amount of an internal combustion engine according to claim 1, wherein, when said target intake air amount is equal to or less than a minimum intake air amount controllable by said variable valve mechanism, said control unit sets said target valve operating characteristic based on the minimum intake air amount.

4. An apparatus for controlling an intake air amount of an internal combustion engine according to claim 3, wherein said minimum intake air amount is calculated based on an engine rotation speed.

5. An apparatus for controlling an intake air amount of an internal combustion engine according to claim 1, wherein said control unit converts a target volume flow ratio equivalent to said target torque into a target valve opening area, and sets said target valve operating characteristic based on the target valve opening area.

6. An apparatus for controlling an intake air amount of an internal combustion engine according to claim 5, wherein said control unit corrects said target valve opening area according to the valve operating characteristic, and sets said target valve operating characteristic based on the corrected target valve opening area.

7. An apparatus for controlling an intake air amount of an internal combustion engine according to claim 6, wherein said control unit corrects said target valve opening area based on a flow loss amount according to a valve lift amount of said intake valve.

8. An apparatus for controlling an intake air amount of an internal combustion engine according to claim 7, wherein said control unit corrects said target valve opening area based on the flow loss amount according to the valve lift amount of said intake valve and also according to an engine rotation speed.

9. An apparatus for controlling an intake air amount of an internal combustion engine according to claim 6, wherein said control unit corrects said target valve opening area according to actual closing timing of said intake valve.

10. An apparatus for controlling an intake air amount of an internal combustion engine according to claim 5, wherein said control unit corrects said target valve opening area according to an intake pressure on the intake valve upstream side, and sets said target valve operating characteristic based on the corrected target valve opening area.

11. An apparatus for controlling an intake air amount of an internal combustion engine according to claim 10, wherein, when said target volume flow ratio is equal to or less than a minimum volume flow ratio controllable by said variable valve mechanism, said control unit does not perform the correction according to the intake pressure on the intake valve upstream side.

12. An apparatus for controlling an intake air amount of an internal combustion engine according to claim 5, wherein said control unit corrects said target valve opening area according to an engine rotation speed, and sets said target valve operating characteristic based on the corrected target valve opening area.

13. An apparatus for controlling an intake air amount of an internal combustion engine according to claim 1, wherein, when said target valve operating characteristic is equal to or above a predetermined upper limit valve operating characteristic, said control unit controls said variable valve mechanism so that the actual valve operating characteristic reaches said upper limit valve operating characteristic.

14. An apparatus for controlling an intake air amount of an internal combustion engine according to claim 13, wherein said upper limit valve operating characteristic is calculated based on an engine rotation speed.

15. An apparatus for controlling an intake air amount of an internal combustion engine according to claim 1, wherein said control unit converts said target volume flow ratio equivalent to said target torque into a requested throttle opening area requested for said throttle valve when said intake valve has a standard valve operating characteristic, corrects the requested throttle opening based on the corrected requested throttle opening area.

16. An apparatus for controlling an intake air amount of an internal combustion engine according to claim 15, wherein said control unit corrects said requested throttle opening area based on a correction value calculated based on a ratio between the atmospheric pressure and an intake pressure on the intake valve upstream side of when said intake valve is the standard valve operating characteristic, and a ratio between the atmospheric pressure and an actual intake pressure on the intake valve upstream side.

17. An apparatus for controlling an intake air amount of an internal combustion engine according to claim 16, wherein said ratio between the atmospheric pressure and the actual intake pressure on the intake valve upstream side is calculated based on an actual intake air amount sucked into the engine, a throttle full-open time intake air amount sucked into the engine at the time when said throttle valve is fully opened, and a new air rate set according to operating conditions of the engine.

18. An apparatus for controlling an intake air amount of an internal combustion engine according to claim 1, wherein said control unit predicts an actual intake air amount controlled by the intake valve based on the operating characteristic of the intake valve and the valve overlap at the operating characteristic, and sets said target throttle opening based on the predicted value and said target intake air amount.

19. An apparatus for controlling an intake air amount of an internal combustion engine according to claim 1, wherein said control unit calculates a valve operating area of the intake valve at said target valve operating characteristic, corrects the valve opening area based on a correction value according to the valve overlap, and sets said target throttle opening based on the corrected valve opening area and said target intake air amount.

20. An apparatus for controlling an intake air amount of an internal combustion engine according to claim 19, wherein said correction value according to the valve overlap is set by correcting a basic correction value to be set based on the valve overlap according to a valve lift amount.

21. An apparatus for controlling an intake air amount of an internal combustion engine according to claim 20, wherein said control unit does not perform the correction according to said valve lift amount when said valve overlap amount is equal to or less than a predetermined amount.

22. An apparatus for controlling an intake air amount of an internal combustion engine according to claim 19, wherein said control unit corrects said valve opening area based on a correction value according to said valve overlap, and also according to an engine rotation speed.

23. An apparatus for controlling an intake air amount of an internal combustion engine according to claim 19, wherein said control unit converts the corrected valve opening area into a volume flow ratio, calculates a requested volume flow ratio in said throttle valve by dividing a target volume flow ratio equivalent to said target torque by the volume flow ratio, and converts the requested volume flow ratio to set said target throttle opening.

24. An apparatus for controlling an intake air amount of an internal combustion engine according to claim 23, wherein said corrected valve opening area is further corrected based on a flow loss value according to said valve lift amount, to be converted into the volume flow ratio.

25. An apparatus for controlling an intake air amount of an internal combustion engine according to claim 1, wherein said variable valve mechanism comprises a mechanism varying a valve lift amount of said intake valve and a mechanism varying valve timing, and said control unit sets a target valve lift amount and target valve timing of said intake valve as said target valve operating characteristic.

26. An apparatus for controlling an intake air amount of an internal combustion engine according to claim 25, wherein said mechanism varying said valve lift amount includes:

a drive shaft rotating in synchronism with a crankshaft; a drive cam fixed to said drive shaft;

a swing cam swinging to operate said intake valve to open and close;

a transmission mechanism with one end connected to said drive cam side and the other end connected to said swing cam side;

a control shaft having a control cam changing the position of said transmission mechanism; and an actuator rotating said control shaft, and successively changes the valve lift amount of said intake valve by rotatingly controlling said control shaft by said actuator, and wherein said mechanism varying said valve timing successively changes a rotation phase of said drive shaft relative to the crankshaft.

27. A method of controlling an intake air amount of an internal combustion engine provided with a variable valve mechanism that varies at least a valve operating characteristic of an intake valve and provided with a throttle valve driven to open and close by an actuator, comprising:

setting a target intake air amount equivalent to a target torque according to the operating conditions of the engine;

setting a target valve operating characteristic based on the set target intake air amount;

controlling said variable valve mechanism so that an actual valve operating characteristic reaches said target valve operating characteristic; and setting a target throttle opening of said throttle valve based on said target intake air amount and said valve operating characteristic, to control said actuator so that an actual throttle opening reaches said target throttle opening.

28. A method of controlling an intake air amount of an internal combustion engine according to claim 27, wherein said target intake air amount is set based on an accelerator opening and an engine rotation speed.

29. A method of controlling an intake air amount of an internal combustion engine according to claim 27, wherein, when said target intake air amount is equal to or less than a minimum intake air amount controllable by said variable valve mechanism, said target valve operating characteristic is set based on the minimum intake air amount.

30. A method of controlling an intake air amount of an internal combustion engine according to claim 29, wherein said minimum intake air amount is calculated based on an engine rotation speed.

31. A method of controlling an intake air amount of an internal combustion engine according to claim 27, wherein a target volume flow ratio equivalent to said target torque is converted into a target valve opening area, and said target valve operating characteristic is set based on the target valve opening area.

32. A method of controlling an intake air amount of an internal combustion engine according to claim 31, wherein said target valve opening area is corrected according to the valve operating characteristic, and said target valve operating characteristic is set based on the corrected target valve opening area.

33. A method of controlling an intake air amount of an internal combustion engine according to claim 32, wherein said target valve opening area is corrected based on a flow loss amount according to a valve lift amount of said intake valve.

34. A method of controlling an intake air amount of an internal combustion engine according to claim 33, wherein said target valve opening area is corrected based on the flow loss amount according to the valve lift amount of said intake valve and also according to an engine rotation speed.

35. A method of controlling an intake air amount of an internal combustion engine according to claim 32, wherein said target valve opening area is corrected according to actual closing timing of said intake valve.

36. A method of controlling an intake air amount of an internal combustion engine according to claim 31, wherein said target valve opening area is corrected according to an intake pressure on the intake valve upstream side, and said target valve operating characteristic is set based on the corrected target valve opening area.

37. A method of controlling an intake air amount of an internal combustion engine according to claim 36, wherein, when said target volume flow ratio is equal to or less than a minimum volume flow ratio controllable by said variable valve mechanism, the correction according to the intake pressure on the intake valve upstream side is not performed.

38. A method of controlling an intake air amount of an internal combustion engine according to claim 31, wherein said target valve opening area is corrected according to an engine rotation speed, and said target valve operating characteristic is set based on the corrected target valve opening area.

39. A method of controlling an intake air amount of an internal combustion engine according to claim 27,
wherein, when said target valve operating characteristic is equal to or above a predetermined upper limit valve operating characteristic, said variable valve mechanism is controlled so that the actual valve operating characteristic reaches said upper limit valve operating characteristic.

40. A method of controlling an intake air amount of an internal combustion engine according to claim 39,
wherein said upper limit valve operating characteristic is calculated based on an engine rotation speed.

41. A method of controlling an intake air amount of an internal combustion engine according to claim 27,
wherein a target volume flow ratio equivalent to said target torque is converted into a requested throttle opening area requested for said throttle valve when said intake valve has a standard valve operating characteristic, the requested throttle opening area is corrected according to the actual valve operating characteristic, and said target throttle opening is set based on the corrected requested throttle opening area.

42. A method of controlling an intake air amount of an internal combustion engine according to claim 41,
wherein said requested throttle opening area is corrected based on a correction value calculated based on a ratio between the atmospheric pressure and an intake pressure on the intake valve upstream side of when said intake valve is the standard valve operating characteristic and a ratio between the atmospheric pressure and an actual intake pressure on the intake valve upstream side.

43. A method of controlling an intake air amount of an internal combustion engine according to claim 42,
wherein said ratio between the atmospheric pressure and the actual intake pressure on the intake valve upstream side is calculated based on an actual intake air amount sucked into the engine, a throttle full-open time intake air amount sucked into the engine when said throttle valve is fully opened, and a new air rate set according to operating conditions of the engine.

44. A method of controlling an intake air amount of an internal combustion engine according to claim 27,
wherein an actual intake air amount controlled by the intake valve is predicted based on the operating characteristic of the intake valve and the valve overlap at the operating characteristic, and said target throttle opening is set based on the predicted value and said target intake air amount.

45. A method of controlling an intake air amount of an internal combustion engine according to claim 27,
wherein a valve operating area of the intake valve at said target valve operating characteristic is calculated, the valve opening area is corrected based on a correction value according to the valve overlap, and said target throttle opening is set based on the corrected valve opening area and said target intake air amount.

46. A method of controlling an intake air amount of an internal combustion engine according to claim 45,
wherein said correction value according to the valve overlap is set by correcting a basic correction value to be set based on the valve overlap according to a valve lift amount.

47. A method of controlling an intake air amount of an internal combustion engine according to claim 46,
wherein the correction according to said valve lift amount is not performed when said valve overlap amount is equal to or less than a predetermined amount.

48. A method of controlling an intake air amount of an internal combustion engine according to claim 45,
wherein said valve opening area is corrected based on a correction value according to said valve overlap, and also according to an engine rotation speed.

49. A method of controlling an intake air amount of an internal combustion engine according to claim 45,
wherein the corrected valve opening area is converted into a volume flow ratio, a requested volume flow ratio in said throttle valve is calculated by dividing a target volume flow ratio equivalent to said target torque by the volume flow ratio, and the requested volume flow ratio is converted to set said target throttle opening.

50. A method of controlling an intake air amount of an internal combustion engine according to claim 49,
wherein said corrected valve opening area is further corrected based on a flow loss value according to said valve lift amount to be converted into the volume flow ratio.

51. A method of controlling an intake air amount of an internal combustion engine according to claim 27,
wherein said variable valve mechanism comprises a mechanism varying a valve lift amount of said intake valve and a mechanism varying valve timing, and
a target valve lift amount and target valve timing of said intake valve are set as said target valve operating characteristic.

52. A method of controlling an intake air amount of an internal combustion engine according to claim 51,
wherein said mechanism varying said valve lift amount includes:
a drive shaft rotating in synchronism with a crankshaft;
a drive cam fixed to said drive shaft;
a swing cam swinging to operate said intake valve to open and close;
a transmission mechanism with one end connected to said drive cam side and the other end connected to said swing cam side;
a control shaft having a control cam changing the position of said transmission mechanism; and
an actuator rotating said control shaft, and
successively changes the valve lift amount of said intake valve by rotatingly controlling said control shaft by said actuator, and
wherein said mechanism varying said valve timing successively changes a rotation phase of said drive shaft relative to the crankshaft.

* * * * *